US012646938B1

(12) United States Patent
Ali et al.

(10) Patent No.: US 12,646,938 B1
(45) Date of Patent: Jun. 2, 2026

(54) SYSTEM AND METHOD FOR DISTRIBUTED CONTROL OF A DIRECT CURRENT MICROGRID

(71) Applicant: King Fahd University of Petroleum and Minerals, Dhahran (SA)

(72) Inventors: Mohamed Abdelfattah Zaery Mohamed Ali, Dhahran (SA); Syed Muhammad Amrr, Dhahran (SA); Shaik Muhammad Suhail Hussain, Dhahran (SA); Mohamed Ali Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/371,973

(22) Filed: Oct. 28, 2025

(51) Int. Cl.
| | |
|---|---|
| *H02J 1/12* | (2026.01) |
| *H02J 1/10* | (2006.01) |
| *H02J 13/12* | (2026.01) |

(52) U.S. Cl.
CPC ................ *H02J 1/12* (2013.01); *H02J 1/106* (2020.01); *H02J 13/12* (2026.01)

(58) Field of Classification Search
USPC ....................................................... 700/295
See application file for complete search history.

(56) References Cited

U.S. PATENT DOCUMENTS 7,962,249 B1 * 6/2011 Zhang ..................... H02J 3/381
720/297

2009/0309551 A1 * 12/2009 Lazarovich ............. B60L 58/22
320/148
2020/0021101 A1 * 1/2020 Giacolini .......... H02M 3/33523
(Continued)

FOREIGN PATENT DOCUMENTS

| CN | 107947175 A | 4/2018 |
|---|---|---|
| CN | 120049392 A | 5/2025 |
| KR | 10-2020-0115373 | 10/2020 |

OTHER PUBLICATIONS

CN_110676834_A (Year: 2020).*

(Continued)

*Primary Examiner* — Hien D Khuu
(74) *Attorney, Agent, or Firm* — Oblon, McClelland, Maier & Neustadt, L.L.P.

(57) ABSTRACT

A method and a system for distributed control of a direct current (DC) microgrid having a plurality of distributed generators (DGs) coupled to a DC bus through a plurality of converters includes measuring local voltage and current of each DG and computing, via a distributed voltage observer, an estimated average bus voltage using neighbor information exchanged over a communication network. Incremental cost (IC) consensus and bus voltage regulation errors are determined and constrained within time-varying performance bounds using an adjustable prescribed performance function (APPF). Control inputs are computed for convergence within a fixed time independent of initial conditions. An event-triggered communication mechanism minimizes data exchange by transmitting updates only when a triggering condition is satisfied. The droop references of the converters are updated to equalize DG ICs within power limits to regulate the estimated average bus voltage of the microgrid towards the nominal bus voltage.

20 Claims, 26 Drawing Sheets

(56) References Cited

U.S. PATENT DOCUMENTS

2021/0203165 A1\*  7/2021  Erokhovets ............. H02J 1/109
2025/0202228 A1    6/2025  Chavan et al.

OTHER PUBLICATIONS

CN_111654019_A (Year: 2020).\*
CN_114865613_A (Year: 2022).\*
CN_112713581_B (Year: 2022).\*
CN_117458492_A (Year: 2024).\*
CN_118763672_A (Year: 2024).\*
Mohamed Zaery, et al., "Prescribed Performance-Based Distributed Predefined Time Control for DC Microgrid Clusters", IEEE Transactions on Circuits and Systems, Mar. 28, 2025, 15 pages.

Mohamed Zaery, et al., "Distributed Optimal Power Dispatch for Islanded DC Microgrids With Time Delays", IEEE Access, vol. 12, Jan. 19, 2024, p. 12533-12544.
Mohamed Zaery, et al., "Distributed Optimal Power Dispatch for Islanded DC Microgrids Based on Predefined-Time Control", IEEE Transactions on Industry Applications, vol. 61, No. 3, May/Jun. 2025, pp. 4730-4743.
Andrey Polyakov, "Nonlinear Feedback Design for Fixed-Time Stabilization of Linear Control Systems", IEEE Transactions on Automatic Control, vol. 57, No. 8, Aug. 2012, pp. 2106-2110.
Seyedali Moayedi, et al., "Unifying Distributed Dynamic Optimization and Control of Islanded DC Microgrids", IEEE Transactions on Power Electronics, vol. 32, No. 3, May 10, 2016, pp. 2329-2346.
Zhiping Cheng, et al., "Distributed fixed-time secondary control for voltage restoration and economic dispatch of DC microgrids", Sustainable Energy, Grids and Networks, vol. 34, Apr. 11, 2023, 8 pages.

\* cited by examiner

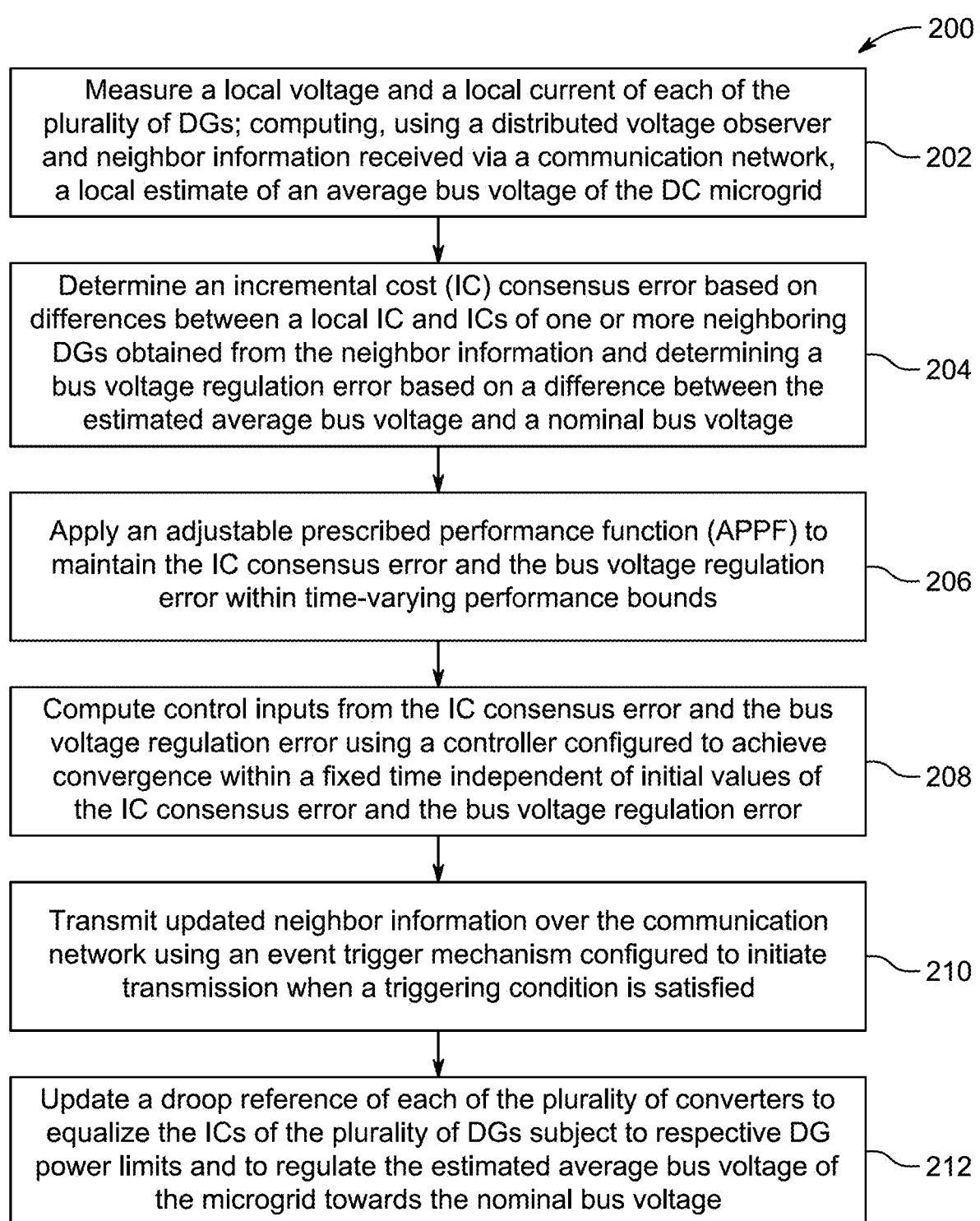

— 200

Measure a local voltage and a local current of each of the plurality of DGs; computing, using a distributed voltage observer and neighbor information received via a communication network, a local estimate of an average bus voltage of the DC microgrid — 202

Determine an incremental cost (IC) consensus error based on differences between a local IC and ICs of one or more neighboring DGs obtained from the neighbor information and determining a bus voltage regulation error based on a difference between the estimated average bus voltage and a nominal bus voltage — 204

Apply an adjustable prescribed performance function (APPF) to maintain the IC consensus error and the bus voltage regulation error within time-varying performance bounds — 206

Compute control inputs from the IC consensus error and the bus voltage regulation error using a controller configured to achieve convergence within a fixed time independent of initial values of the IC consensus error and the bus voltage regulation error — 208

Transmit updated neighbor information over the communication network using an event trigger mechanism configured to initiate transmission when a triggering condition is satisfied — 210

Update a droop reference of each of the plurality of converters to equalize the ICs of the plurality of DGs subject to respective DG power limits and to regulate the estimated average bus voltage of the microgrid towards the nominal bus voltage — 212

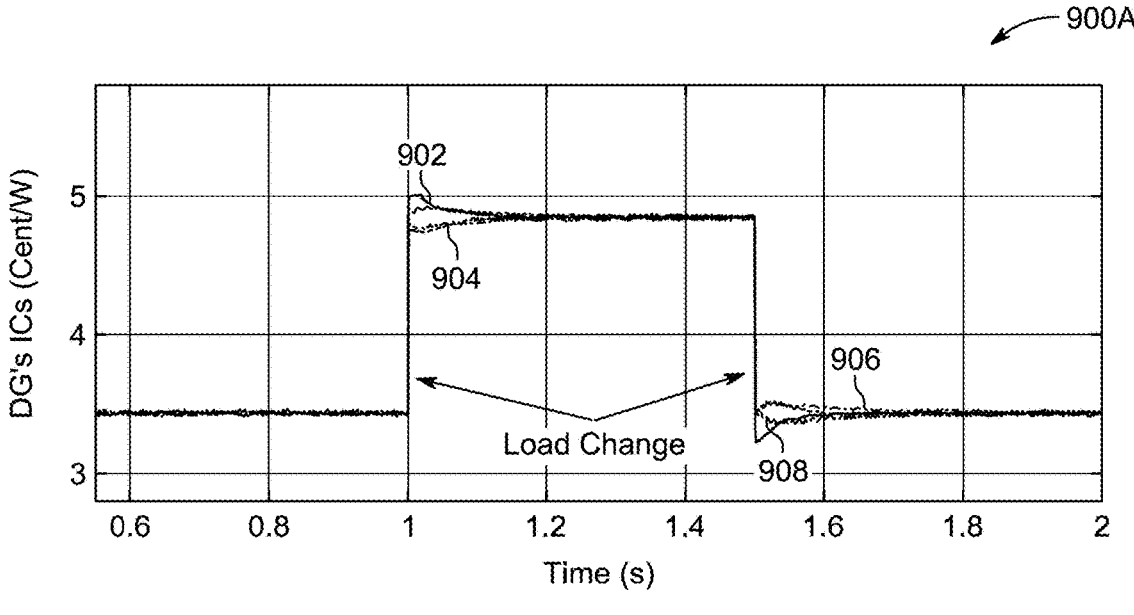
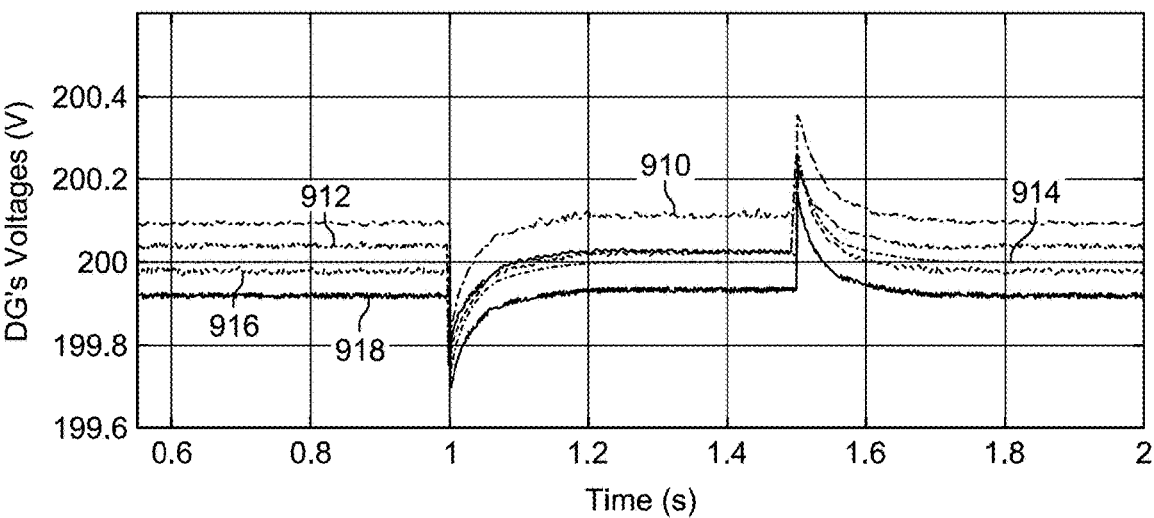
FIG. 9A

900B
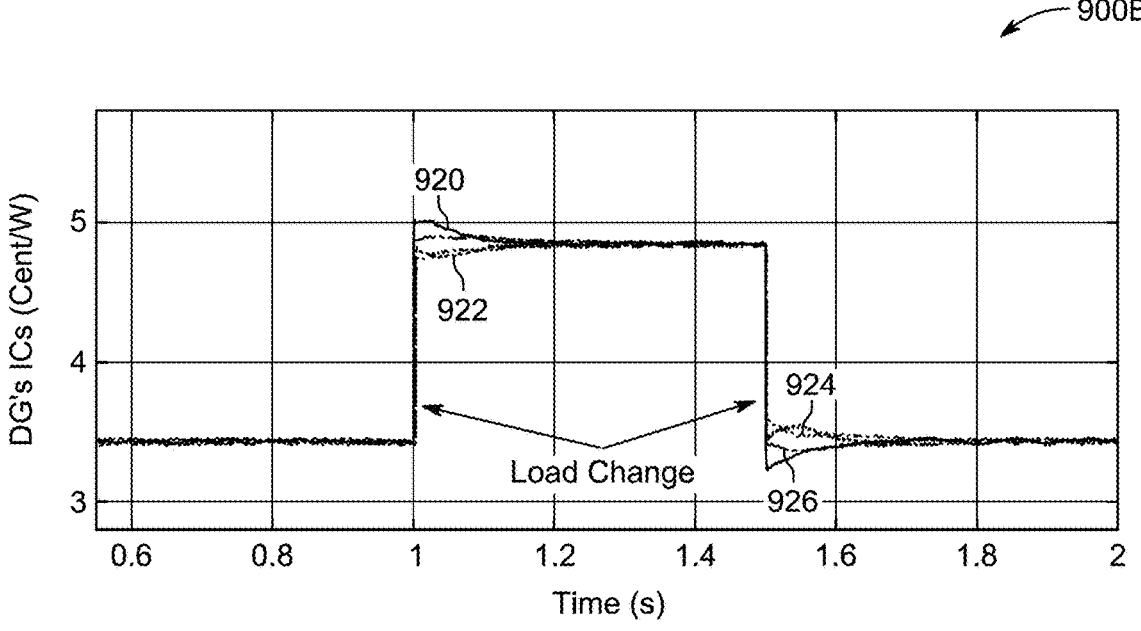
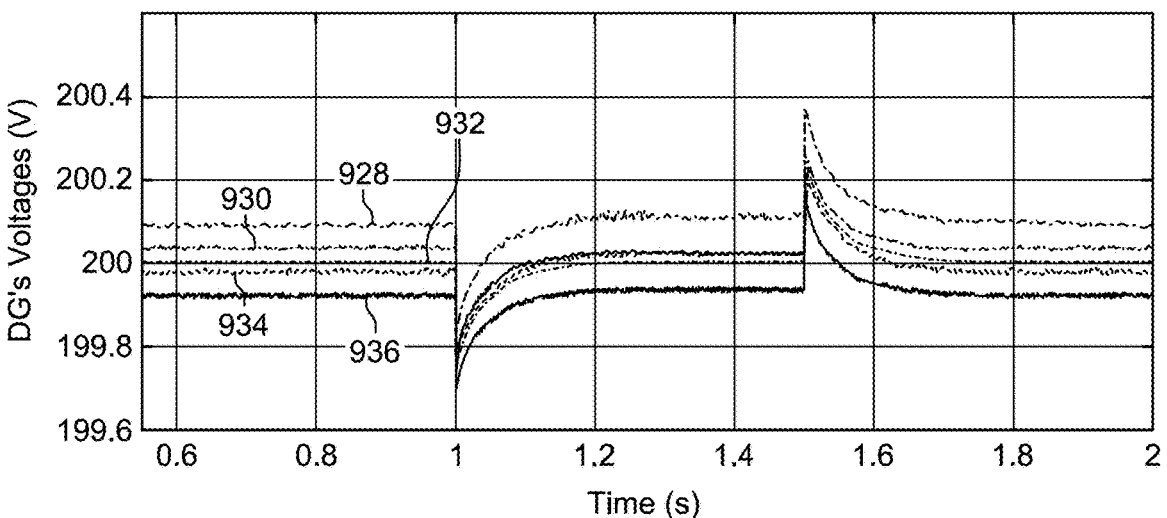
FIG. 9B

900C
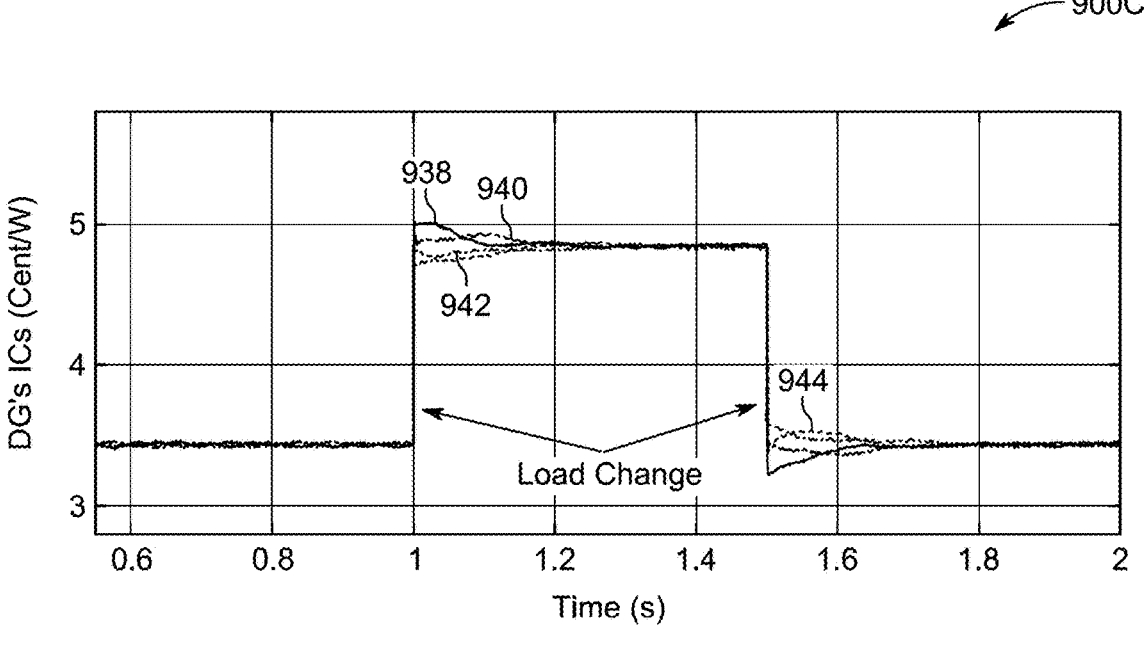
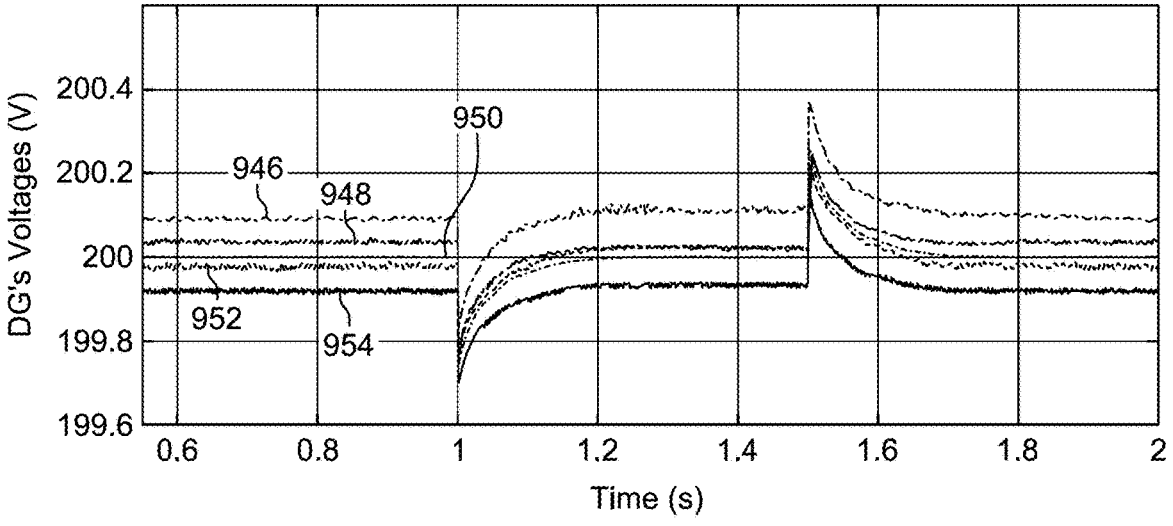
FIG. 9C

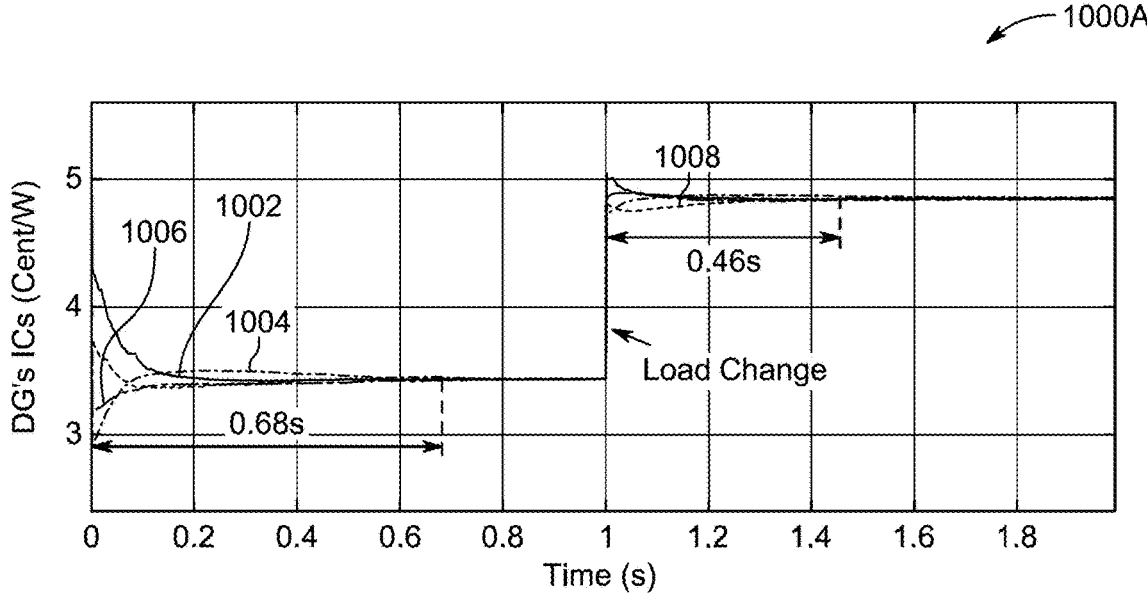
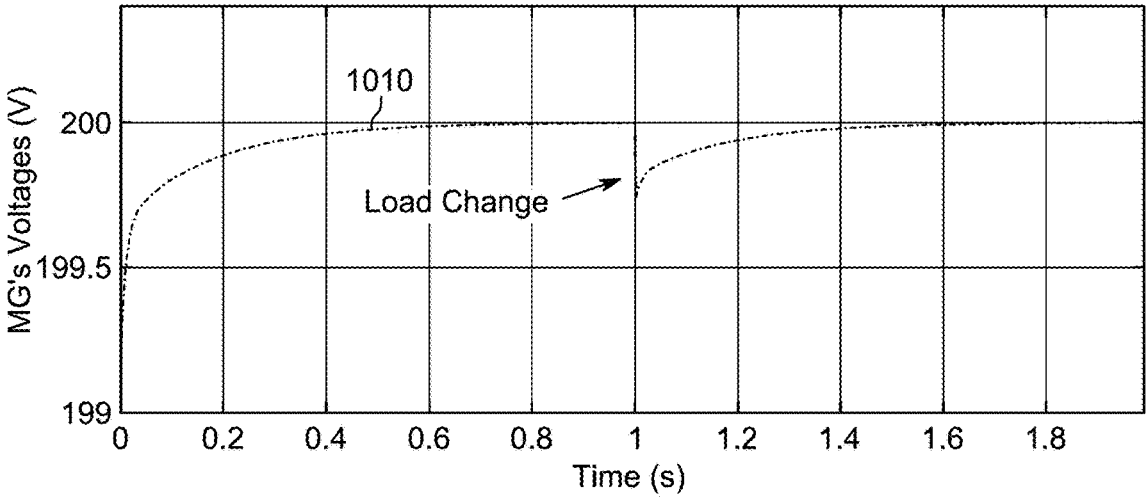
FIG. 10A

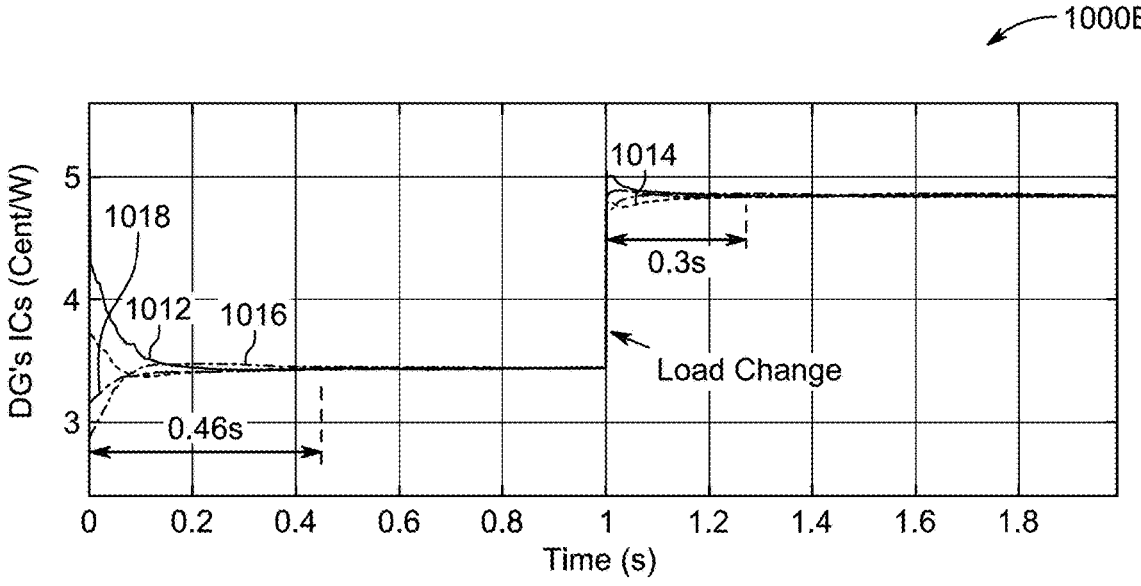
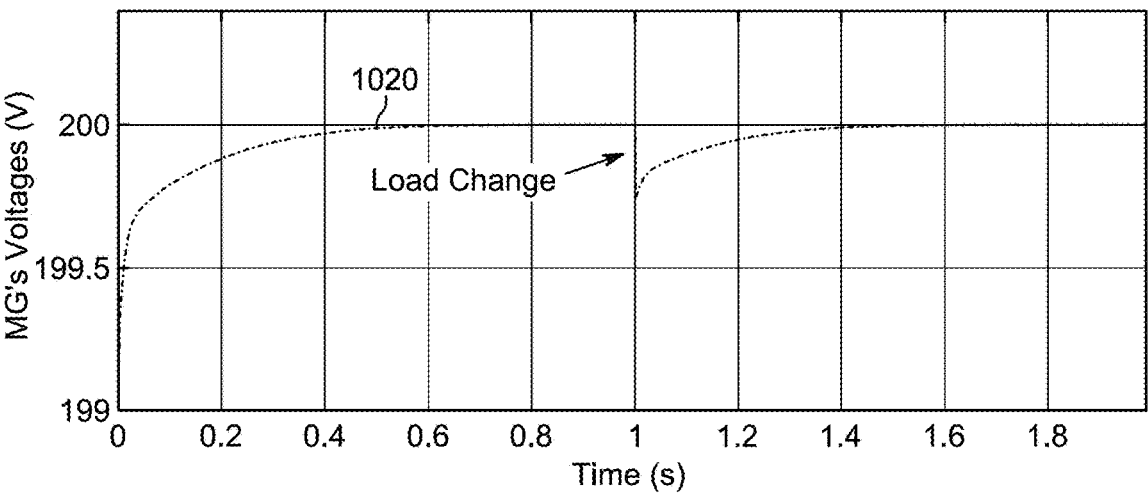
FIG. 10B

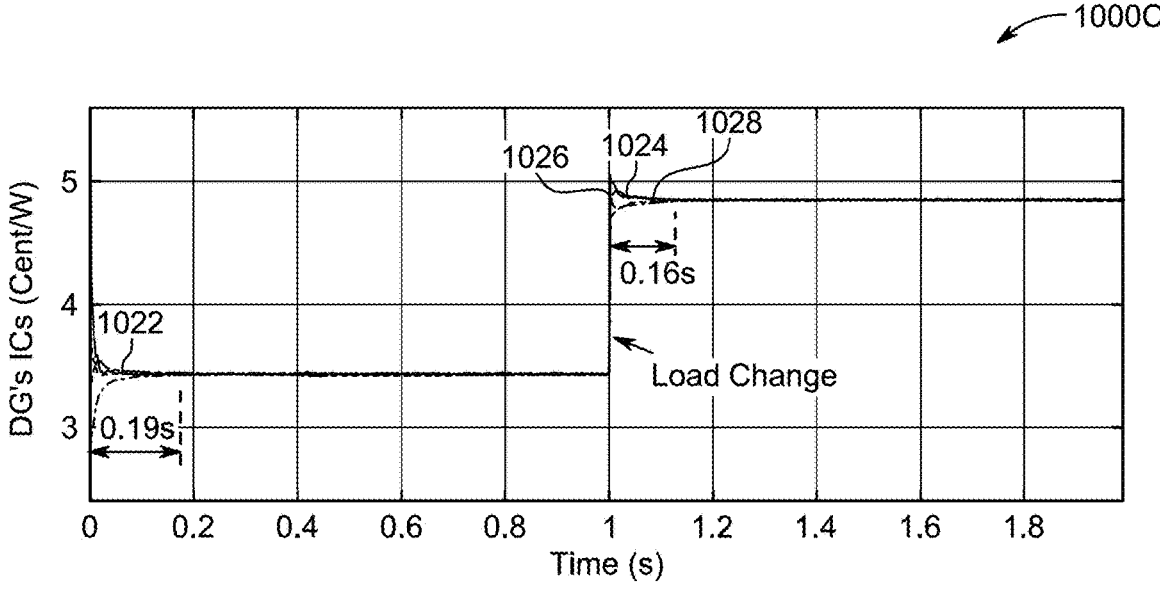
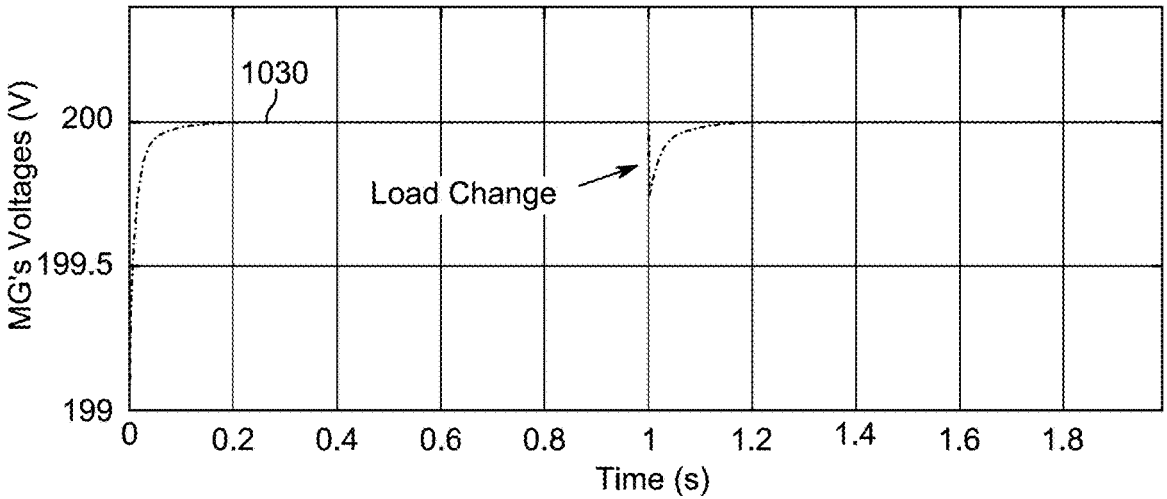
FIG. 10C

SYSTEM AND METHOD FOR DISTRIBUTED CONTROL OF A DIRECT CURRENT MICROGRID

STATEMENT OF ACKNOWLEDGEMENT

Support provided by the Interdisciplinary Research Center for Sustainable Energy Systems (IRC-SES), King Fahd University of Petroleum & Minerals (KFUPM), under Project No. INSE2411 is gratefully acknowledged.

BACKGROUND

Technical Field

The present disclosure is directed to a method and a system for distributed control of a direct current (DC) microgrid having a plurality of distributed generators (DGs) coupled to a DC bus through converters.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Direct current (DC) microgrids have emerged as a promising paradigm for integrating distributed renewable generation, storage resources, and flexible loads in a resilient, scalable, and efficient manner. Compared with conventional alternating current (AC) networks, DC microgrids alleviate synchronization demands, reduce conversion losses in interfacing with renewable and storage systems, and simplify interconnection of electronic loads. Typical DC microgrids comprise of multiple distributed generators (DGs), such as photovoltaic panels, wind turbines with rectifiers, or battery systems, interfaced with a common DC bus through power electronic converters that regulate the power exchange.

Conventional control strategies for DC microgrids rely primarily on hierarchical control architectures. At the lowest level, primary control schemes implement local droop characteristics in the converters to share load among DGs without explicit communication. While droop control provides plug-and-play capability, it suffers from steady-state voltage deviations and inaccurate power sharing when DG cost characteristics differ. Secondary control layers, often centralized, restore voltage levels and refine power-sharing accuracy, but such schemes require continuous communication with a central controller, creating potential single points of failure and scalability bottlenecks. Tertiary control layers address economic dispatch objectives, but similarly depend on global system awareness and centralized optimization.

In recent years, distributed and consensus-based control approaches have been investigated to overcome these limitations. Such methods utilize limited neighbor-to-neighbor communication over sparse communication graphs to collectively estimate global states (e.g., average bus voltage) and achieve coordinated objectives such as economic dispatch or voltage regulation. While distributed controllers reduce reliance on centralized coordination, they introduce new technical challenges. These include ensuring convergence speed independent of initial conditions, avoiding instability under time-varying loads, preventing communication burdens and Zeno behavior under event-triggered schemes, and enforcing prescribed transient and steady-state performance constraints.

Classical consensus algorithms guarantee asymptotic convergence but often require long settling times, which is undesirable in microgrids experiencing rapid load or generation changes. To improve convergence, finite-time and fixed-time consensus strategies have been studied, but ensuring both fast dynamics and robustness to uncertainties remains an open problem. In addition, economic dispatch requires equalization of incremental costs (ICs) of DGs subject to generation limits; however, incorporating these constraints while simultaneously regulating the DC bus voltage in a distributed manner poses significant technical difficulty.

Another limitation of prior distributed methods lies in their treatment of performance specifications. Conventional designs may ensure convergence in theory but do not explicitly constrain the transient response, allowing overshoot or violation of voltage and power-sharing bounds during disturbances. For safety-critical and mission-critical microgrids, such as those deployed in military bases, remote communities, or electric vehicle charging networks, violation of operational bounds is unacceptable. Mechanisms for enforcing bounded performance in real-time, particularly under variable load conditions, are not adequately addressed in existing literature.

Moreover, practical communication considerations impose further constraints. Event-triggered schemes reduce communication overhead relative to periodic exchange of state information, but without carefully designed triggering rules and minimum inter-event times, such schemes may exhibit Zeno behavior, where infinitely many transmissions occur in finite time, rendering implementation impractical. Balancing communication efficiency with system stability and convergence remains a major research challenge.

Accordingly, there exists a need for improved distributed control methods and systems for DC microgrids that (i) achieve fixed-time convergence of voltage regulation and incremental cost consensus errors independent of initial conditions, (ii) enforce time-varying performance bounds on both steady-state and transient behavior, (iii) integrate event-triggered communication with guaranteed minimum inter-event times to prevent Zeno behavior, and (iv) realize distributed economic dispatch subject to DG power limits while ensuring bus voltage regulation.

Accordingly, there remains a need to overcome the limitations of the prior art.

SUMMARY

In an exemplary embodiment, a method for distributed control of a direct current (DC) microgrid having a plurality of distributed generators (DGs) coupled to a DC bus through a plurality of converters. The method includes measuring a local voltage and a local current of each of the plurality of DGs. The method includes computing, using a distributed voltage observer and neighbor information received via a communication network, a local estimate of an average bus voltage of the DC microgrid. The method includes determining an incremental cost (IC) consensus error based on differences between a local IC and ICs of one or more neighboring DGs obtained from the neighbor information and determining a bus voltage regulation error based on a difference between the estimated average bus voltage and a nominal bus voltage. The method includes applying an adjustable prescribed performance function (APPF) to maintain the IC consensus error and the bus voltage regulation error within time-varying performance bounds. The method includes computing control inputs from the IC consensus error and the bus voltage regulation error using a controller configured to achieve convergence within a fixed time independent of initial values of the IC consensus error and the bus voltage regulation error. The method includes transmitting updated neighbor information over the communication network using an event trigger mechanism configured to initiate transmission when a triggering condition is satisfied. The method includes updating a droop reference of each of the plurality of converters to equalize the ICs of the plurality of DGs subject to respective DG power limits and to regulate the estimated average bus voltage of the microgrid towards the nominal bus voltage.

In an exemplary embodiment, a distributed control system for a direct current (DC) microgrid. The system includes a DC bus. The system includes a plurality of DGs coupled to the DC bus through a plurality of converters, each converter comprising a primary droop controller. The system includes a DG controller associated with each of the plurality of DGs, comprising a processor, a memory, one or more sensors and a communication interface, the memory storing instructions that, when executed by the processor, cause the DG controller to measure a local voltage and a local current of each of the plurality of DGs. The DG controller computes, using a distributed voltage observer and neighbor information received via the communication interface, a local estimate of an average bus voltage of the microgrid. The DG controller determines an IC consensus error based on differences between a local IC and ICs of one or more neighboring DGs and determine a bus voltage regulation error based on a difference between the estimated average bus voltage and a nominal bus voltage. The DG controller applies an APPF to maintain the errors within time-varying performance bounds. The DG controller computes control inputs from the IC consensus error and the bus voltage regulation error using a controller configured to achieve a fixed-time convergence independent of initial values of the IC consensus error and the bus voltage regulation error. The DG controller transmits updated neighbor information via an event-trigger mechanism when a triggering condition is satisfied. The DG controller updates a droop reference of the converter to equalize the ICs of the DGs subject to DG power limits and to regulate the estimated average bus voltage toward the nominal bus voltage.

In another exemplary embodiment, the foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2 shows a flow diagram of a method for distributed control of a direct current (DC) microgrid having a plurality of distributed generators (DGs) coupled to a DC bus through a plurality of converters, in accordance with embodiments of the present disclosure

FIG. 9(A) presents a graphical representation of the Incremental Cost (IC) synchronization convergence plotted against time, in accordance with embodiments of the present disclosure.

FIG. 9(B) depicts a graphical representation of the Average DC Bus Voltage (Vavg) regulation convergence plotted against time, in accordance with embodiments of the present disclosure.

FIG. 9(C) depicts a graphical representation of the system performance under ETE delays plotted against time, in accordance with embodiments of the present disclosure.

FIG. 10(A) presents a graphical representation of the Incremental Costs (ICs) of the DGs and the Average DC Bus Voltage plotted against time, in accordance with embodiments of the present disclosure.

FIG. 10(B) depicts a graphical representation of the Incremental Costs (ICs) of the DGs and the Average DC Bus Voltage plotted against time, in accordance with embodiments of the present disclosure.

FIG. 10(C) shows a graphical representation of the Incremental Costs (ICs) of the DGs and the Average DC Bus Voltage plotted against time, in accordance with embodiments of the present disclosure.

DETAILED DESCRIPTION

Figure 1:
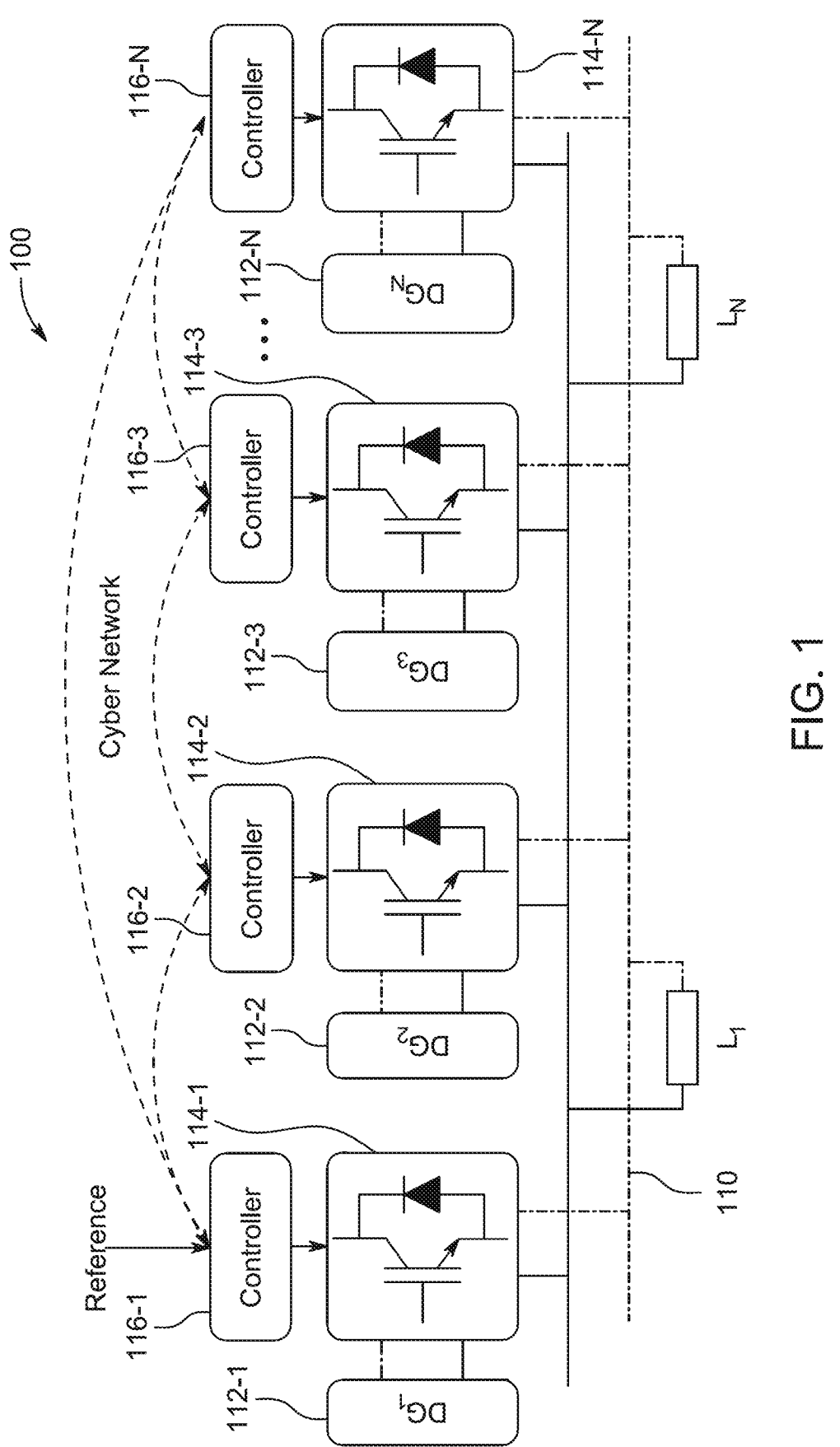
FIG. 1 shows a block diagram of a distributed control system for a direct current (DC) microgrid, in accordance with embodiments of the present disclosure

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The present disclosure provides a distributed control system and method for direct current (DC) microgrids that employs event-triggered communication mechanisms with guaranteed avoidance of Zeno behaviour. The system and method integrate dynamic triggering functions with adaptive inter-event time enforcement to achieve stable voltage and current regulation while minimizing communication overhead between distributed generation units (DGUs). The approach ensures that the number of triggering events within any finite time interval remains bounded, thereby providing a practically deployable alternative to periodic communication schemes.

In various aspects of the disclosure, non-limiting definitions of one or more terms that will be used in the document are provided below.

A term "event-triggered control (ETC)" refers to a control paradigm in which system states are updated or exchanged only when a state-dependent condition is satisfied, as opposed to fixed periodic updates.

A term "distributed generation unit (DGU)" refers to a converter-interfaced power source, such as a photovoltaic array, wind turbine, or battery storage system, connected to the microgrid for power generation or storage.

A term "inter-event time (IET)" refers to the duration between two consecutive triggering instants in an event-triggered scheme, wherein a strictly positive minimum value ensures implementability.

A term "Zeno behaviour" refers to a pathological condition in which infinitely many triggering events occur within a finite time interval, thereby rendering the scheme physically unrealizable.

A term "dwell-time constraint" refers to a design condition that enforces a minimum inter-event time (IET) to prevent Zeno behaviour while preserving control stability.

A term "distributed secondary control layer (DSC layer)" refers to a communication-based control framework in which DGUs exchange information with peers to achieve current sharing, voltage restoration, and stability objectives across the microgrid.

The present disclosure addresses several technical challenges in the design of communication-efficient microgrid controllers. A first challenge is the excessive communication load associated with periodic control updates, which consumes bandwidth and reduces scalability. A second challenge is the instability or impracticality that may arise in naive event-triggered designs, where frequent triggering under fluctuating conditions overwhelms the communication network. A further challenge is the emergence of Zeno behaviour, which prevents real-world implementation of theoretical triggering schemes.

The DGs are connected to the power network via DC/DC converters to meet system power demand. DGs can be classified as either dispatchable or non-dispatchable. The renewable energy sources (RES) such as wind turbines and photovoltaic (PV) systems, are non-dispatchable due to their unpredictable and stochastic generation. Controlled using maximum power point tracking (MPPT) techniques to optimize power extraction and maximize their utilization, RES are excluded from the EDP due to their negligible generation costs. Conversely, conventional generators, powered by fuel or gas, are classified as dispatchable DGs. Their generation cost is typically modeled using a quadratic equation as in (1), based on their output power:

$$C_i(P_i) = a_i P_i^2 + b_i P_i + c_i \tag{1}$$

where $a_i$, $b_i$, and $c_i$ represent the cost coefficients associated with the generation of $DG_i$. Solving the EDP requires optimizing the power scheduling to minimize MG's TGC while meeting the equality and inequality constraints, as defined in (2).

$$\min\left(\sum_{i=1}^{N} C_i(P_i)\right) \tag{2a}$$

$$\sum_{i=1}^{N} P_i = P^L + P_{loss} - \sum_{k \subseteq RE} P_{res} = P^D \tag{2b}$$

$$P_i^{min} \le P_i < P_i^{max} \tag{2c}$$

where $P^L$ represents the total load demands, $P_{res}$ refers to the power generated by RES, $P_{loss}$ is the transmission line losses, and $P^D$ denotes the net power demand.

$P_i^{min}$ and $P_i^{max}$ signify the minimum and maximum capacities of $DG_i$, respectively.

By ignoring the inequality constraints specified in (2b), the given optimization problem can be reformulated using Lagrange operator, $\mathcal{L}(\cdot)$ as below $$\mathcal{L}(P_i, \xi) = \sum_{i=1}^{N} C_i(P_i) + \xi \left( P^D - \sum_{i=1}^{N} P_i \right) \tag{3}$$

where $\lambda$ represents the Lagrange multiplier, acting as the IC to ensure the generation-demand power balance is maintained. According to the widely recognized method of equal ICs, the ICs of all DGs must be synchronized with the optimal IC, represented as $\xi^*$, to achieve the optimal power dispatch.

$$\xi^* = \frac{P^D - \sum_{i=1}^{N} b_i/2a_i}{\sum_{i=1}^{N} 1/2a_i} \tag{4}$$

Therefore, $DG_i$'s optimal output power can be determined by $$P_i^* = (\xi^* - b_i)/2a_i \tag{5}$$

Moreover, considering the capacity limitations of the DGs, the optimal operating point can be slightly modified as in (5).

$$P_i^* = \begin{cases} \dfrac{\xi^* - b_i}{2a_i}, & \text{for } i \notin \varpi \\ P_i^{min}, \text{ or } P_i^{max}, & \text{for } i \in \varpi \end{cases} \tag{6}$$

where $\overline{\omega}$ represents the subset of DGs with generation constrained by the violated production limit. This indicates that all DGs with inactive generation bounds must have equal ICs for optimum load dispatching. But, for DGs operating at their power bounds $$P_i^{min} \text{ and } P_i^{max},$$

the IC value can be either $$\left(2a_i P_i^{min} + b_i\right) \text{ or } (2a_i P_i^{max} + b_i),$$

respectively.

FIG. 1 illustrates the cybernetic structure of the DC MG, highlighting the flow of information among DGs through a directed graph denoted as $G=(\mathcal{V}, \varepsilon, \mathcal{A})$. In this graph, $\mathcal{V} = (\mathcal{V}_1, \mathcal{V}_2, \ldots \mathcal{V}_N) \in \mathbb{R}^N$ represents the set of nodes corresponding to the N DGs within the MG. The edges connecting these nodes, defined as $\varepsilon=(\varepsilon_1, \varepsilon_2, \ldots \varepsilon_N)$ and satisfying $\varepsilon \subset \mathcal{V} \times \mathcal{V}$, signify the communication pathways linking the DGs. The adjacency matrix $\mathcal{A} =[a_{ij}] \in \mathbb{R}^{N \times N}$, indicates the strength of the cybernetic links, where a positive value of $a_{ij}$ denotes an active communication link from $DG_i$ to $DG_j$, while $a_{ij}=0$ means no connection. Additionally, the pinning matrix $\mathcal{B}$ is a diagonal matrix containing elements, $b_i$, corresponding to the pinning gain of $DG_i$. These $b_i$ gains take positive values if $DG_i$ is configured to receive nominal values provided by the higher control layer and are zero when no such configuration exists.

Consider a nonlinear autonomous system with state $x \in \mathbb{R}^N$ $$\dot{x}(t)=f(x(t)), \; x(0)=x_0 \tag{7}$$

where f(x): $\mathbb{R}^N \to \mathbb{R}^N$ is a continuous function, satisfies $f(0)=0$, i.e., the origin is the equilibrium point for system (7). The system (7) will be globally fixed-time stable if it satisfies the following lemma condition.

Suppose V(x): $\mathbb{R}^N \to \mathbb{R}^+$ is a continuous and positive definite function for system (7), with $\sigma_1>0$, $\sigma_2>0$, $\mu_1 \in (0, 1)$, and $\mu_1 \in (1, 2)$, such that $$\dot{V}(x) \leq -\sigma_1 V^{\mu_1}(x) - \sigma_2 V^{\mu_2}(x) \tag{8}$$

then, the state x will converge to its equilibrium point, origin, within the following upper limit $T_{max}$ of settling time $T_S$ $$T_S \leq T_{max} := \frac{1}{\sigma_1(1 - \mu_1)} + \frac{1}{\sigma_2(\mu_2 - 1)} \tag{9}$$

Lemma 2: Let $\pi_1, \pi_2, \ldots, \pi_n \geq 0$, $0 < n \leq 1$ and $\sigma > 1$. Then $$\sum_{i=1}^{k} \pi_i^n \geq \left( \sum_{i=1}^{k} \pi_i \right)^n \tag{10a}$$

$$\sum_{i=1}^{k} \pi_i^\sigma \geq k^{1-\sigma} \left( \sum_{i=1}^{k} \pi_i \right)^\sigma \tag{10b}$$

The prescribed performance function is used to achieve system performance as per the desired performance that satisfies the state constraint objectives (11). To achieve the control objectives, the following boundary constraints are imposed on each error $e_i(t) \in \mathbb{R}$ of the DG $$-\underline{\mu}_i(t)\rho_i(t) < e_i(t) < \overline{\mu}_i(t)\rho_i(t) \tag{11}$$

where $\rho_i(t) \in \mathbb{R}$ is a PPF, $\overline{\mu}_i(t)$ and $\underline{\rho}_i(t)$ are the upper and lower adjustable variables of PPF. In conventional PPF method, $\overline{\mu}_i$ and $\underline{\mu}_i$ are constants. However, the PPF of the present disclosure will devise a novel time varying boundary, discussed in the subsequent subsection. Adherence of $e_i(t)$ to the given bounds (11) guarantees the desired system response and compliance with the prescribed constraints. Consequently, the selection of a user-defined PPF ensures that the system state behaves as required. The PPF is defined as follows:

The PPF $\rho_i(t): \mathbb{R}^+ \to \mathbb{R}^+$ is a decreasing function that must satisfy the following properties:
i. $\rho_i(t)>0$ and $\dot{\rho}_i(t)<0$,
ii.

$$\lim_{t \to \infty} \rho_i(t) = \rho_{i,s} > 0, \; \rho_{i,s}$$

where the maximum allowable steady-state value.
In this work, the PPF is selected as $$\rho_i(t)=(\rho_{i,0}-\rho_{i,s})\exp^{-\wp_i t} + \rho_{i,s}, \; \forall t \geq 0 \tag{12}$$

where $\rho_{i,s}$, $\rho_{i,0}$, and $\wp_i$ are positive constants.

Existing systems typically employs fixed values of $\underline{\mu}_g$ and $\bar{\mu}_g$. However, when error $e_i(t)$ approaches the PPF boundary, substantial control effort is required for error correction. A key limitation of the conventional PPF is its inability to automatically readjust to the initial value $(\rho_{i,0})$ once the steady-state value of $\rho_i(t)$ is reached (i.e., $\rho_{i,s}$). This means that if a significant rise in error occurs in steady state period due to changes in the system, the conventional PPF cannot readjust adaptively. Moreover, in the presence of input saturation, the controller may be unable to generate the required control effort, potentially leading to boundary violations and closed-loop instability. To mitigate these issues, the present disclosure provides an adjustable prescribed performance function (APPF).

The methods and systems of the present disclosure overcome the above-mentioned challenges by providing a modular event-triggered framework comprising: (i) a triggering unit that continuously evaluates local system deviations against a predefined threshold function; (ii) a dwell-time enforcement unit that guarantees a strictly positive minimum IET to eliminate Zeno behaviour; (iii) a communication scheduler that coordinates information exchange among DGUs only when necessary; and (iv) a distributed control unit that updates local control references based on received information to achieve global current sharing and voltage regulation. In an embodiment, the system further comprises an adaptive threshold adjustment mechanism to optimize trade-offs between control accuracy and communication savings under varying load and generation conditions.

One objective of the present disclosure is to reduce the communication overhead in DC microgrids while preserving voltage stability and proportional current sharing among DGUs. Another objective is to ensure guaranteed implementability by preventing Zeno behavior through the explicit enforcement of minimum IETs. A further objective is to improve resilience and scalability by enabling DGUs to operate in a fully distributed manner, without reliance on centralized controllers.

Accordingly, the present disclosure provides a practical, communication-efficient, and stability-guaranteed event-triggered control strategy for DC microgrids that unites rigorous theoretical guarantees with real-world feasibility, thereby enabling more sustainable and scalable microgrid operation.

FIG. 1 shows a block diagram of a distributed control system 100 for a direct current (DC) microgrid, in accordance with embodiments of the present disclosure.

In an embodiment, the system is designed to achieve voltage regulation and current sharing among a plurality of distributed generation units (DGs), while ensuring communication efficiency and practical implementability through an event-triggered mechanism. The system 100 further prevents non-implementable triggering phenomena and guarantees fixed-time convergence of the control errors, independent of their initial values.

In an embodiment, the DC microgrid includes a DC bus 110 configured to interconnect a plurality of DGs 112-1, 112-2, . . . , 112-N. The DC bus 110 serves as a common electrical node for voltage regulation and current sharing. Each of the plurality of DGs 112 is electrically coupled to the DC bus 110 through a corresponding converter 114-1, 114-2, . . . , 114-N.

In an embodiment, each converter 114 is a bidirectional DC-DC converter or a unidirectional boost/buck converter depending on the generation type. Each converter 114 includes a primary droop controller implemented in an inner voltage loop. The primary droop controller regulates the converter output voltage according to a droop characteristic, such that the output voltage decreases linearly with an increase in the output current, thereby facilitating current sharing among the DGs without centralized coordination.

In an embodiment, each DG 112 is associated with a DG controller 116-1, 116-2, . . . 116-N. The DG controller 116 includes a processor, a memory, one or more sensors, and a communication interface. The processor may be a microcontroller, digital signal processor (DSP), or embedded control processor configured to execute control algorithms stored in the memory. The memory stores executable instructions, local voltage/current measurements, and communication data exchanged with neighboring DG controllers. The sensors may include voltage and current transducers configured to measure the local voltage and local current of the corresponding DG 112. The communication interface enables information exchange between neighboring DG controllers using a wired or wireless medium, forming a connected communication network.

In an embodiment, each DG controller 116 implements a distributed voltage observer. The distributed voltage observer computes a local estimate of the average bus voltage of the DC microgrid based on both the locally measured voltage and the neighbor information received through the communication interface. The estimation follows a consensus-based update rule such that the distributed estimates of all DG controllers asymptotically converge to the global average bus voltage.

In an embodiment, at least one DG controller 116 is pinned to the nominal bus voltage to anchor the estimation process and ensure absolute reference alignment. The pinned DG acts as a reference node for the distributed voltage observer, ensuring that deviations in other DG voltage estimates are corrected over time through the consensus update mechanism.

In an embodiment, the processor of each DG controller 116 computes an IC consensus error and a bus voltage regulation error. The IC consensus error is determined based on the difference between the local current and the currents of neighboring DGs received via the communication interface. The bus voltage regulation error is computed as the difference between the locally estimated average bus voltage and the nominal bus voltage.

In an embodiment, the DG controller 116 applies an adjustable prescribed performance function (APPF) to maintain these errors within time-varying performance bounds. The APPF ensures that both IC consensus error and bus voltage regulation error evolve within predefined dynamic envelopes that dictate transient and steady-state behavior. The APPF dynamically adjusts the time-varying performance bounds during transient conditions to ensure fast convergence without overshoot or violation of operational limits.

The APPF provides dual benefits: it defines both transient and steady-state behaviors in advance, and it incorporates adjustable performance boundaries to address abrupt system changes during steady-state operation. The system 100 effectively mitigates challenges such as input saturation and boundary crossing. The adjustable variable $\bar{\mu}_i(t)$ and $\underline{\mu}_i(t)$ of the APPF of the present disclosure is:

$$-\underline{\mu}_i(t) = -\tilde{\mu}_i - z_i(t) \tag{13}$$

$$\bar{\mu}_i(t) = \tilde{\mu}_i + z_i(t) \tag{14}$$

where $\tilde{\mu}_i > 0$ is a fixed parameter, designed according to the constraint (11), and $z_i(t)$ is an adjustable signal, defined as $z_i(t)=h_i(t)/\rho_i(t)$. Here, $h_i(t)$ is the trajectory of the auxiliary dynamics, defined as:

$$\dot{h}_i(t)=-\alpha_i h_i(t)+\beta_i|e_i(t)|, \quad h_i(0)>0 \tag{15}$$

where $\alpha_i>0$ is a constant and $\beta_i>0$ is selected according to the below rule:

$$\beta_i = \begin{cases} \beta_{min}, & |e_i(t)| \le \epsilon \\ \beta_{max}, & |e_i(t)| > \epsilon \end{cases} \tag{16}$$

with $\beta_{max}>>\beta_{min}>0$ are maximum and minimum constant values of $\beta_i$ and $\in>0$ is a constant limit on error. Also $\in\beta_{min}<\alpha_i$. The switching value of $\beta_i$ is chosen to facilitate rapid increase and decrease in the value of auxiliary variable $h_i(t)$.

In an embodiment when $|e_i(t)|\in$, auxiliary variable $h_i(t)$ will decrease and have a near-zero value. As a result, the boundaries $-\underline{\mu}_i(t)$ and $\bar{\mu}_i(t)$ will become fixed, i.e., $-\tilde{\mu}_i$ and $\tilde{\mu}_i$, respectively, replicating a conventional PPF technique. Conversely, when $|e_i(t)|>\in$, boundaries $-\underline{\mu}_i(t)$ and $\bar{\mu}_i(t)$ will be adjusted adaptively at a high rate based on changes in $z_i(t)$ (in other terms $h_i(t)$). Thus, ensuring that $e_i(t)$ will remain within the boundaries and extensively enhancing the robustness.

Figure 3:
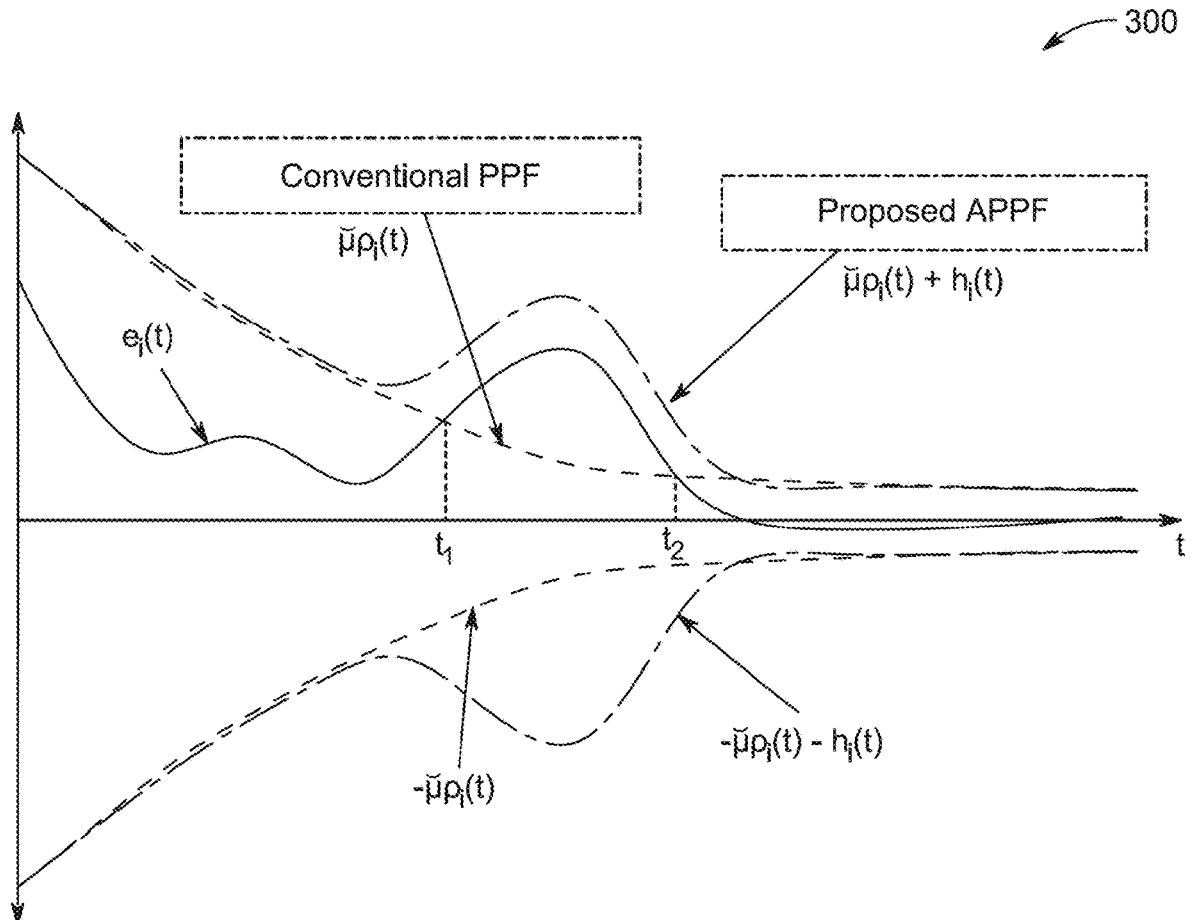
FIG. 3 illustrates a comparison of the APPF of the present disclosure and the conventional PPF, in accordance with embodiments of the present disclosure

FIG. 3 illustrates the comparison 300 of the APPF of the present disclosure and the conventional PPF. As shown in FIG. 3, when $e_i(t)$ approaches the upper performance boundary $\tilde{\mu}_i\rho_i(t)$ at $t>t_1$, the conventional PPF will require a large control effort to steer $e_i(t)$ away from the boundary. However, if required control falls below the minimum control effort, i.e., if saturation occurs, then $e_i(t)$ can cross the boundary. To prevent this, the APPF of the present disclosure temporarily widens the boundary by using $\tilde{\mu}_i\rho_i(t)+h_i(t)$ during $t_1<t<t_2$, where $h_i(t)$ is a positive value formulated in (15). When $|e_i(t)|>\in$, $h_i(t)$ increases, preventing boundary crossing, and when $|e_i(t)|\le\in$ after $t>t_2$, $h_i(t)$ returns to zero, restoring the original boundary $\tilde{\mu}_i\rho_i(t)$.

Further, the error $e_i(t)$ can be transformed into a new variable $\Xi_i$, using a modulation variable $v_i(t)=e_i(t)/\rho_i(t)$, as $$\Xi_i=\mathcal{M}_i(v_i, \underline{\mu}_i,\bar{\mu}_i)=0.5\ln(v_i+\underline{\mu}_i)-0.5\ln(\bar{\mu}_i-v_i) \tag{17}$$

The time derivative of $\mu_i(t)$ using chain rule can be expressed as $$\begin{aligned}
\dot{\Xi}_i(t) &= \frac{0.5}{v_i + \mu_i}(\dot{v}_i + \dot{\mu}_i) - \frac{0.5}{\bar{\mu}_i - v_i}(\dot{\bar{\mu}}_i - \dot{v}_i) \\
&= \frac{1}{2}\left\{\frac{\dot{v}_i - \dot{z}_i}{v_i + \mu_i} - \frac{\dot{z}_i - \dot{v}_i}{\bar{\mu}_i + v_i}\right\} \\
&= \frac{\dot{v}_i - \dot{z}_i}{2}\left\{\frac{\mu_i + \bar{\mu}_i}{(v_i + \mu_i)(\bar{\mu}_i - v_i)}\right\} \\
&= \frac{\mu_i + \bar{\mu}_i}{2(v_i + \underline{\mu}_i)(\bar{\mu}_i - v_i)}(\dot{v}_i - \dot{z}_i) \\
&= \varsigma_i\left(\frac{\dot{e}_i\rho_i - \dot{\rho}_i e_i}{\rho_i^2} - \frac{\dot{h}_i\rho_i - \dot{\rho}_i h_i}{\rho_i^2}\right) \\
&= \frac{\varsigma_i}{\rho_i}\left(\left(\dot{e}_i - \frac{\dot{\rho}_i}{\rho_i}e_i\right) - \left(\dot{h}_i - \frac{\dot{\rho}_i}{\rho_i}h_i\right)\right) \\
&= \frac{\varsigma_i}{\rho_i}\left(\dot{e}_i + \frac{\dot{\rho}_i}{\rho_i}(h_i - e_i) - \dot{h}_i\right) = \varpi_i(\dot{e}_i + \zeta_i)
\end{aligned} \tag{18}$$

where $\varpi_i=\varsigma_i>0$, $\zeta_i=(\dot{\rho}_i/\rho_i)(h_i-e_i)-\dot{h}_i\ge0$, and $\dot{\rho}_i=-\wp_i(\rho_{i,0}-\rho_{i,s})\exp^{-\rho_i t}$.

Property 1: The PPF Holds the Following Properties:

i. $|\Xi_i| \ge \gamma|v_i| = \gamma|e_i/\rho_i|,$ (19a)

where $\gamma = 4/(\bar{\mu}_i + 1)$ ii. $\varsigma_i = \dfrac{\mu_i + \bar{\mu}_i}{2(v_i + \underline{\mu}_i)(\bar{\mu}_i - v_i)} > 0$ (19b)

iii. $\dfrac{\dot{\rho}_i}{\rho_i} > \wp_i > 0$ (19c)

In an embodiment, $\varpi_i$ and $\zeta_i$ are functions of measurable error $e_i$ and known PPF parameters ($\underline{\mu}_i$, $\bar{\mu}_i$, $h_i$).

In an embodiment, the PPF method is to transform the original error $e_i$ into $\Xi_i$ using (12). Consequently, proving the boundedness of $\Xi_i$ through the stability analysis of the transformed error dynamics (17) directly implies convergence of the original system state. This is because stability of $\Xi_i$ ensures that $e_i$ resides within the monotonically decreasing set $(-\underline{\mu}_i(t)\rho_i(t),\bar{\mu}_i(t)\rho_i(t))$ for $t\ge0$, and ultimately converge to a compact set $(-\tilde{\mu}_i\rho_{i,s},\tilde{\mu}_i\rho_{i,s})$ during the steady state. Therefore, ensuring the boundedness of $\Xi_i$ is sufficient to satisfy the prescribed constraints (11) on error state.

To prove the stability of transformed error $\Xi_i$, first it is important to ensure the boundedness of auxiliary variable $z_i$.

Also state of auxiliary dynamics (15) for the APPF with the given switching gain (16) will remain bounded, i.e., there exist a constant $\Delta$ such that $$|h_i(t)|\le\Delta, \quad \forall t\ge0 \tag{20}$$

Subsequently, the boundedness of $h_i$ ensures boundedness of $z_i$ since $z_i=h_i/\rho_i$.

In an embodiment, the DG controller 116 transforms the IC consensus error and the bus voltage regulation error into respective transformed errors using a monotone mapping function. This transformation linearizes the nonlinear prescribed performance constraints, allowing the DG controller 116 to operate within a simplified domain while guaranteeing that the original errors respect their prescribed bounds.

In an embodiment, the transformed errors are input into a fixed-time controller that computes control inputs to achieve convergence of the IC consensus and voltage errors within a fixed time that is independent of their initial values. The fixed-time controller may employ nonlinear state feedback terms that satisfy fixed-time stability criteria.

In an embodiment, each DG controller 116 transmits updated neighbor information through an event-trigger mechanism. The event-trigger mechanism evaluates a triggering condition based on deviations in local measurements, control inputs, or error dynamics. When the triggering condition is satisfied, the DG controller 116 transmits updated data to its neighbors; otherwise, communication is suppressed, thereby reducing bandwidth usage.

In an embodiment, the DG controller 116 enforces a positive minimum inter-event time when transmitting updated neighbor information. This enforcement ensures that consecutive triggering instants, thereby preventing Zeno behavior, a condition wherein infinitely many triggers could occur in finite time.

In an embodiment, the DG controller 116 updates a droop reference of the converter 114 to equalize the ICs of all DGs 112 subject to their respective DG power limits. The updated droop reference is computed based on the control inputs derived from the fixed-time controller. This ensures that each DG 112 contributes proportionally to the total load according to its capacity, achieving economic dispatch while maintaining voltage stability.

In an embodiment, the converters 114 are pulse-width modulated (PWM), and the droop reference serves as an input to the inner voltage loop of the primary droop controller 116. The PWM-based control ensures smooth adjustment of converter duty cycles to track the updated droop reference and maintain the desired output voltage.

In an embodiment, the DG controllers 116 are interconnected through a communication network that forms a connected communication graph represented by an adjacency matrix. Each nonzero element in the adjacency matrix denotes a communication link between DG controllers. The connected communication graph ensures convergence of both the IC consensus error and the bus voltage regulation error. The communication topology may be designed as a ring, mesh, or arbitrary connected structure, provided that it satisfies connectivity conditions required for distributed consensus.

Each DG controller 116 measures its local voltage and current via the sensors and computes the distributed voltage estimate through the voltage observer. The controller then evaluates the IC consensus and voltage regulation errors, which are processed through the APPF and transformed by the monotone mapping function. The fixed-time controller computes control signals, which adjust the droop reference of the converter 114. The converter 114, through the primary droop controller and PWM modulation, regulates the DG output voltage to achieve current equalization and voltage restoration. Simultaneously, the event-trigger mechanism coordinates inter-DG communication efficiently, ensuring the prevention of Zeno behavior and maintaining stable, synchronized operation across the microgrid.

As $\bar{\omega}i$ and $\zeta_i$ are functions of measurable error $e_i$ and known PPF parameters ($\underline{\mu}_i$, $\bar{\mu}_i$, $h_i$), their computation and integration into the control strategy of the present disclosure are easy. The PPF method transforms the original error $e_i$ into $\Xi_i$ using (12). Consequently, proving the boundedness of $\Xi_i$ through the stability analysis of the transformed error dynamics (17) directly implies convergence of the original system state. This is because stability of $\Xi_i$ ensures that $e_i$ resides within the monotonically decreasing set $(-\underline{\mu}_i(t)\rho_i(t), \bar{\mu}_i(t)\rho_i(t))$ for t≥0, and ultimately converge to a compact set $(-\mu_i\rho_{i,s}, \mu_i\rho_{i,s})$ during the steady state. Therefore, ensuring the boundedness of $\Xi_i$ is sufficient to satisfy the prescribed constraints (11) on error state.

To prove the stability of transformed error $\Xi_i$, first it is important to ensure the boundedness of auxiliary variable $z_i$.

Subsequently, the boundedness of $h_i$ ensures boundedness of $z_i$ since $z_i = h_i/\rho_i$.

Figure 4:
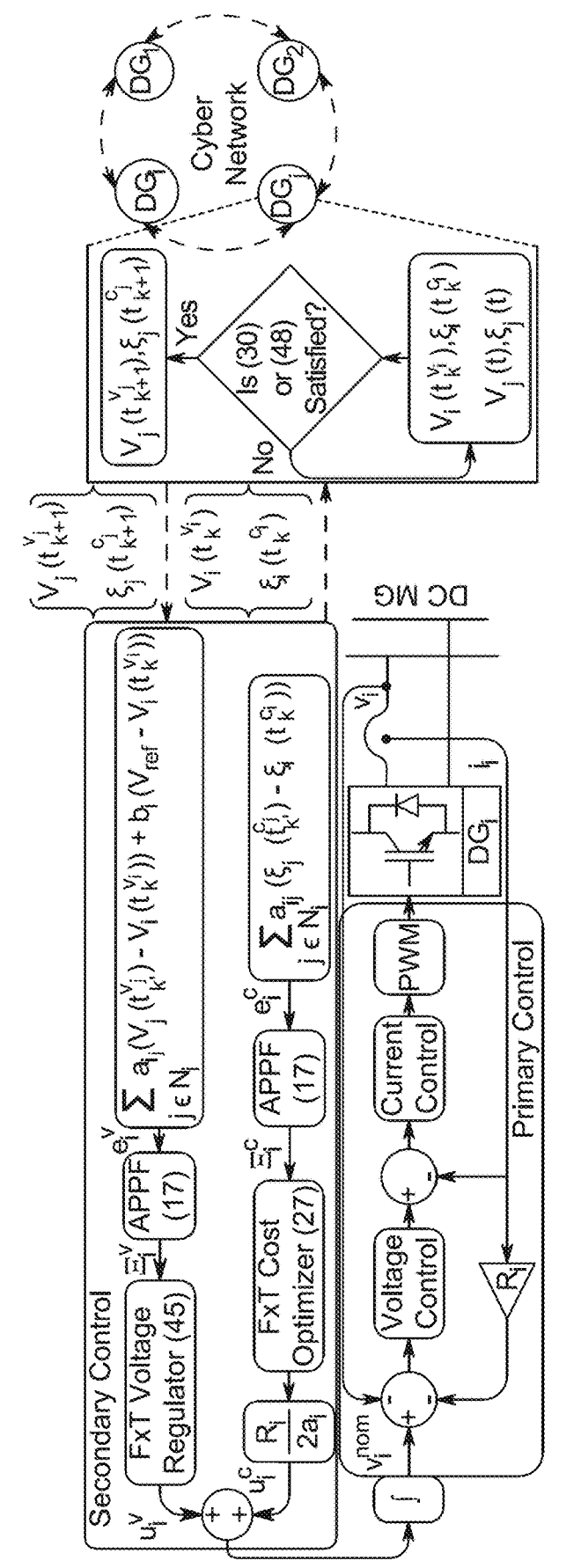
FIG. 4 illustrates a block diagram of the present APPF-ET-FxT control scheme, in accordance with embodiments of the present disclosure.

As illustrated in FIG. 4, each DG is managed through a two-layer control system comprising primary and secondary controllers. The primary control layer consists of a droop controller and two inner loops that manage voltage and current. The droop controller adjusts the voltage reference provided to the inner voltage control loop, ensuring precise management of DG output, as defined in (21).

$$V_i = V_i^{nom} - R_i * P_i \tag{21}$$

where, $V_i$ and $R_i$ signifies voltage and droop gain of $DG_i$, and $$V_i^{nom}$$

denotes the nominal voltage MG set by the secondary controller. Substituting (5) into (21) and employing the feedback linearization method, gives:

$$\dot{V}_i^{nom} = \dot{V}_i + \frac{R_i}{2a_i} * \dot{\xi}_i = u_i^v(t) + \frac{R_i}{2a_i} * u_i^c(t) \tag{22}$$

where $$u_i^v(t) \text{ and } u_i^c(t)$$

are the auxiliary control inputs for voltage regulation and cost reduction, respectively. Therefore, the nominal voltage of the primary controller can be defined as:

$$V_i^{nom} = \int \left( u_i^v(t) + \frac{R_i}{2a_i} * u_i^c(t) \right) dt \tag{23}$$

The secondary control scheme comprises two control loops: voltage regulator and cost optimizer. The cost optimizer aligns the ICs of all DGs($\xi_i$) within the MG while ensuring that tracking errors stay within the prespecified performance limits, all in a fixed settling time, $t_{fc}$, as specified in (24a). The voltage regulator, on the other hand, ensures that the MG's average voltage remains stable at the reference level, achieving this within a fixed settling time, $t_{fv}$, as described in (24b).

$$\lim_{t \to t_{fc}} |\xi_i - \xi_j| = 0, \ \& \ \underline{e}_i^c \le (\xi_i - \xi_j) \le \overline{e}_i^c \tag{24a}$$

$$\lim_{t \to t_{fv}} \left| \sum_{i=1}^{N} \frac{V_i}{N} - V_{ref} \right| = 0, \ \& \ \underline{e}_i^v \le \left( \sum_{i=1}^{N} \frac{V_i}{N} - V_{ref} \right) \le \overline{e}_i^v \tag{24b}$$

where $$\underline{e}_i^c, \overline{e}_i^c, \underline{e}_i^v, \overline{e}_i^v$$

are the desired lower and upper limits of cost and voltage regulation errors, respectively.

Minimization of the TGC for the MG is accomplished by efficiently allocating demand across DGs 112 and ensuring their ICs are equalized. In this regard, each DG 112 compares its IC, $\xi_i$, with the IC of neighboring DGs 112, $\xi_j$, within the MG to manage the consensus error of ICs, $$e_i^c.$$

In this work, the ET scheme is implemented, where the information of DG states is transmitted to the neighboring's controllers only at the time of triggering instants. This mechanism significantly reduces the communication and computation burden on MG. The consensus error of ICs of $DG_i$ using event triggered states are expressed as:

$$e_i^c(t) = \sum_{j \in N_i} a_{ij}\left(\xi_j\left(t_{k'}^{cj}\right) - \xi_i\left(t_k^{ci}\right)\right) \tag{25}$$

Here, $$k' := \arg\min_p\left\{\left(t - t_p^j\right)\middle| t \geq t_p^j,\, p \in N^+\right\}.$$

For each $$\xi_i(t),\, t \in \left\{t_k^{ci}\middle| k = 1, 2, \dots\right\}$$

where $$t_k^{ci}$$

represents the last ET time for ICs of DG$_i$. For each $$t \in \left[t_k^{ci}, t_{k+1}^{ci}\right),\, t_{k'}^{cj}$$

is the last ET time for ICs of neighboring DG$_j$. In the ET scheme of the present disclosure, the state measurement of DG$_i$ and the neighboring DGs gets updated at their own triggering time $$t_0^{ci}, t_1^{ci}, \dots,\text{ and } t_0^{cj}, t_1^{cj}, \dots,$$

respectively.

Now, incorporating the APPF into $$e_i^c(t)$$

to dictate the desired prescribed performance for $$e_i^c(t).$$

Accordingly, the transformed cost error will be $$\Xi_i^c(t) = \mathcal{M}_i(\upsilon_i^c),\text{ where }\upsilon_i^c(t) = e_i^c(t)/\rho_i^c(t).$$

Also, from (17) and IC dynamics $$\dot{e}_i^c(t) = u_i^c(t),$$

one can write $$\Xi_i^c(t) = \varpi_i^c(t)(u_i^c(t) + \zeta_i^c(t)) \tag{26}$$

where $$\varpi_i^c = \frac{S_i^c}{\rho_i^c} \cdot \frac{\partial \mathcal{M}_i^c}{\partial \upsilon_i^c} > 0,\ \zeta_i^c = \frac{\dot{\rho}_i^c}{\rho_i^c}(h_i^c - e_i^c) - \dot{h}_i^c \geq 0.$$

All the terms with superscript $(\cdot)^c$ have same corresponding definitions associated with error $$e_i^c$$

as defined in Section III (b) and (c). Using the inverse dynamics approach, the ET of the present disclosure based APPF-FxT control scheme for regulating the cost error is given as:

$$u_i^c(t) = \frac{\bar{u}_i^c(t)}{\varpi_i^c(t)} - \zeta_i^c(t);\, t \in \left\{t_k^{ci}\middle| k = 0, 1, \dots\right\} \tag{27}$$

$$\text{where } \bar{u}_i^c(t) = -K_1^c\left\lfloor \Xi_i^c\left(t_k^{ci}\right)\right\rceil^{\phi_1^c} - K_2^c\left\lfloor \Xi_i^c\left(t_k^{ci}\right)\right\rceil^{\phi_2^c}, \tag{28}$$

Where $$\lfloor \Xi_i^c\rceil^{\phi^c} = |\Xi_i^c|^{\phi^c}\operatorname{sign}(\Xi_i^c),\, K_1^c > 0,\, K_2^c > 0$$

are IC controller gains, and $$\phi_1^c \in (0, 1),\, \phi_2^c \in (1, 2)$$

are IC exponents. Defining an intermediate measurement error $$E_i^c(t)$$

as $$E_i^c(t) = -K_1^c\left\lfloor \Xi_i^c\left(t_k^{ci}\right)\right\rceil^{\phi_1^c} - K_2^c\left\lfloor \Xi_i^c\left(t_k^{ci}\right)\right\rceil^{\phi_2^c} + K_1^c\left\lfloor \Xi_i^c(t)\right\rceil^{\phi_1^c} + K_2^c\left\lfloor \Xi_i^c(t)\right\rceil^{\phi_2^c} \tag{29}$$

where $$t \in \left\{t_k^{ci}, t_k^{ci} + \delta,\, \dots,\, t_{k+1}^{ci} - \delta\right\},$$

and $\delta$ is a sampling period.

Further, given the connected undirected cyber graph G, the ET of the present disclosure based APPF-FxT control (28) achieves consensus in ICs for all DGs within fixed time. Moreover, the cost error $$e_i^c$$

remains within a prescribed time-varying boundary during transient and steady-state periods. The ET of the present disclosure mechanism updates the state information, and consequently the control value, under the following triggering condition:

$$t_{k+1}^c = \min\{t \ge t_k^c : |E_i^c(t)| \ge \varepsilon_1^c K_1^c |\Xi_i^c(t)|^{\phi_1^c} + \varepsilon_2^c K_2^c |\Xi_i^c(t)|^{\phi_2^c}\}, \tag{30}$$

$$k = 0, 1, 2, \ldots \text{ where } \varepsilon_1^c, \varepsilon_2^c \in (0, 1).$$

The stability is proved in two steps. In the first part, FxT convergence of transformed error $$\Xi_i^c(t)$$

is established. Part 1: Consider a positive definite Lyapunov function $\mathcal{W}_i$ as $$w_1(t) = \frac{1}{2} \Xi^{c^T}(t) \Xi^c(t) = \frac{1}{2} \sum_{i=1}^{n} (\Xi_i^c(t))^2 \in \mathbb{R} \tag{31}$$

$$\text{where } \Xi^c(t) = [\Xi_1^c, \Xi_2^c, \ldots, \Xi_n^c]^T \in \mathbb{R}^n, t \in \{t_k^{ci} \mid k = 0, 1, \ldots \}.$$

Also, when $$t \in \left[t_k^{ci}, t_{k+1}^{ci}\right), w_1(t) = w_1\left(t_k^{ci}\right).$$

The time derivative of $\mathcal{W}_1(t)$ yields $$\dot{w}_1 = \sum_{i=1}^{n} \Xi_i^c \dot{\Xi}_i^c = \sum_{i=1}^{n} \Xi_i^c \varsigma_i^c (u_i^c - \zeta_i^c) \tag{32}$$

For brevity, argument t is omitted from the later part. Substituting the control (28) of the present disclosure into (32) gives $$\dot{\mathcal{W}}_1 = \sum_{i=1}^{N} \Xi_i^c u_i^c \tag{33}$$

$$= \sum_{i=1}^{-c} \left(-K_1^c \lfloor \Xi_{-i}^c \left(t_k^{ci}\right) \rceil^{\phi_1^c} - K_2^c \lfloor \Xi_{-i}^c \left(t_k^{ci}\right) \rceil^{\phi_2^c}\right)$$

$$= -K_1^c \sum_{i=1}^{N} |\Xi_{-i}^c|^{\phi_1^c+1} - K_2^c \sum_{i=1}^{n} |\Xi_{-i}^c|^{\phi_2^c+1}$$

$$= -K_1^c \sum_{i=1}^{N} \left(|\Xi_{-i}^c|^2\right)^{\frac{\phi_1^c+1}{2}} - K_2^c \sum_{i=1}^{n} \left(|\Xi_{-i}^c|^2\right)^{\frac{\phi_2^c+1}{2}}$$

It is evident that the incorporation of event-triggered (ET) measurement updates introduces certain performance deviations when compared to schemes employing continuous measurement updates. The influence of the ET mechanism on system performance may be quantitatively addressed within the convergence analysis by accounting for the maximum error induced by the ET update process. Specifically, the maximum error, represented as, $$\varepsilon_1^c K_1^c \sum_{i=1}^{n} |\Xi_i^c|^{\phi_1^c+1} + \varepsilon_2^c K_2^c \sum_{i=1}^{n} |\Xi_i^c|^{\phi_2^c+1}$$

as derived from Equation (30), is incorporated into the Lyapunov stability analysis. Accordingly, the Lyapunov function derivative expressed in Equation (33) can be conservatively upper bounded to capture the impact of the ET mechanism on the system's convergence characteristics. Consequently, (33) can be upper bounded as follows:

$$\dot{\mathcal{W}}_1 \le -K_1^c \sum_{i=1}^{N} \left(|\Xi_{-i}^c|^2\right)^{\frac{\phi_1^c+1}{2}} - \tag{34}$$

$$K_2^c \sum_{i=1}^{N} \left(|\Xi_{-i}^c|^2\right)^{\frac{\phi_2^c+1}{2}} + \varepsilon_1^c K_1^c \sum_{i=1}^{N} |\Xi_{-i}^c|^{\phi_1^c+1} + \varepsilon_2^c K_2^c \sum_{i=1}^{N} |\Xi_{-i}^c|^{\phi_2^c+1}$$

$$= -K_1^c \sum_{i=1}^{N} \left(|\Xi_{-i}^c|^2\right)^{\frac{\phi_1^c+1}{2}} - K_2^c \sum_{i=1}^{N} \left(|\Xi_{-i}^c|^2\right)^{\frac{\phi_2^c+1}{2}} +$$

$$\varepsilon_1^c K_1^c \sum_{i=1}^{N} \left(|\Xi_{-i}^c|^2\right)^{\frac{\phi_1^c+1}{2}} + \varepsilon_2^c K_2^c \sum_{i=1}^{N} \left(|\Xi_{-i}^c|^2\right)^{\frac{\phi_2^c+1}{2}}$$

$$= -(1 - \varepsilon_1^c) K_1^c \sum_{i=1}^{N} \left(|\Xi_{-i}^c|^2\right)^{\frac{\phi_1^c+1}{2}} - (1 - \varepsilon_2^c) K_2^c \sum_{i=1}^{N} \left(|\Xi_{-i}^c|^2\right)^{\frac{\phi_2^c+1}{2}}$$

Equation (34) can be upper bounded as $$\dot{\mathcal{W}}_1 \le \tag{35}$$

$$-(1 - \varepsilon_1^c) K_1^c \left(\sum_{i=1}^{N} |\Xi_{-i}^c|^2\right)^{\frac{\phi_1^c+1}{2}} - n\frac{1 - \phi_2^c}{2} (1 - \varepsilon_2^c) K_2^c \left(\sum_{i=1}^{N} |\Xi_{-i}^c|^2\right)^{\frac{\phi_2^c+1}{2}}$$

$$= -2^{\frac{\phi_1^c+1}{2}} (1 - \varepsilon_1^c) K_1^c \left(\sum_{i=1}^{N} |\Xi_{-i}^c|^2/2\right)^{\frac{\phi_1^c+1}{2}} -$$

$$2^{\frac{\phi_2^c+1}{2}} n^{\frac{1 - \phi_2^c}{2}} (1 - \varepsilon_2^c) K_2^c \left(\sum_{i=1}^{N} |\Xi_{-i}^c|^2/2\right)^{\frac{\phi_2^c+1}{2}}$$

$$= -\psi_1^c \left(\sum_{i=1}^{N} |\Xi_{-i}^c|^2/2\right)^{\theta_1} - \psi_2^c \left(\sum_{i=1}^{N} |\Xi_{-i}^c|^2/2\right)^{\theta_2}$$

$$\le -\psi_1^c \left(\|\Xi^c\|^2/2\right)^{\theta_1} - \psi_2^c \left(\|\Xi^c\|^2/2\right)^{\theta_2}$$

$$\le -\psi_1^c \mathcal{W}_1^{\theta_1} - \psi_2^c \mathcal{W}_1^{\theta_2}$$

where $\psi_1^c = 2^{\frac{\phi_1^c+1}{2}} (1 - \varepsilon_j^c) K_1^c > 0, \psi_2^c = 2^{\frac{\phi_2^c+1}{2}} n^{\frac{1 - \phi_2^c}{2}} (1 - \varepsilon_2^c) K_2^c > 0,$ $$\theta_1 = (\phi_1^c + 1)/2 < 1, \theta_2 = \frac{\phi_2^c + 1}{2} \in (1, 2).$$

The final inequality of Lyapunov function $\dot{\mathcal{W}}_1$ satisfies the fixed time condition. Therefore, the transformed errors which is defined as $$\zeta_i^c := \frac{\dot{\rho}_i^c}{\rho_i^c}(h_i^c - e_i^c) - \dot{h}_i^c,$$

$\Xi_i^c$ will converge to zero within fixed time.

Once the transformed error will become $$\zeta_i^c = -\frac{\dot{\rho}_i^c e_i^c}{\rho_i^c}.$$

$\Xi_i^c$ is stabilized, the cost error

Therefore, plugging this value of $\zeta_i^c$ $e_i^c$ will also convergence to zero and reside inside the bound of in (37) yields $$v_i^c(t) = \frac{1}{\rho_i^c}\frac{\bar{u}_i^c}{\varpi_i^c} = \frac{-1}{\rho_i^c\varpi_i^c}\left(K_1^c\lfloor \Xi_i^c(t_k^{c_i})\rceil^{\phi_1^c} + K_2^c\lfloor \Xi_i^c(t_k^{c_i})\rceil^{\phi_2^c}\right) \tag{38}$$

$$v_i^c(t) = \frac{-1}{\varsigma_i^c}\left(K_1^c\lfloor \Xi_i^c(t_k^{c_i})\rceil^{\phi_1^c} + K_2^c\lfloor \Xi_i^c(t_k^{c_i})\rceil^{\phi_2^c}\right)$$

$\rho_i^c(t).$

The proof commences by determining the time derivative of the modulation variable since $$\rho_i^c\varpi_i^c = \rho_i^c\frac{\varsigma_i^c}{\rho_i^c} = \varsigma_i^c > 0.$$

$$v_i^c(t) := e_i^c(t)/\rho_i^c(t),$$

which is expressed as follows:

Consider another Lyapunov candidate $\mathcal{W}_2$ as $$v_i^c(t) = \frac{\dot{e}_i^c\rho_i^c - \dot{\rho}_i^c e_i^c}{\rho_i^{c2}} = \frac{1}{\rho_i^c}\left(\dot{e}_i^c - \frac{\dot{\rho}_i^c e_i^c}{\rho_i^c}\right) \tag{36}$$

$$v_i^c(t) = \frac{1}{\rho_i^c}\left(u_i^c - \frac{\dot{\rho}_i^c e_i^c}{\rho_i^c}\right)$$

$$\mathcal{W}_2(t) = \frac{1}{2}v^{c^T}(t)v^c(t) \tag{39}$$
$$= \frac{1}{2}\sum_{i=1}^n (v_i^c(t))^2$$
$$\in \mathbb{R}$$

Substituting control where $$v^c(t) = [v_1^c, v_2^c, \dots, v_n^c]^T \in \mathbb{R}^n, t \in \{t_k^{c_i}|k = 0, 1, \dots \}.$$

$u_i^c$ from (28) into (36) gives

Time derivative of $\mathcal{W}_2(t)$ after substituting (39) gives $$v_i^c(t) = \frac{1}{\rho_i^c}\left(\frac{\bar{u}_i^c}{\varpi_i^c} - \zeta_i^c - \frac{\dot{\rho}_i^c e_i^c}{\rho_i^c}\right) \tag{37}$$

$$\dot{\mathcal{W}}_2(t) = -\sum_{i=1}^{N}\frac{v_i^c(t)}{\varsigma_i^c(t)}(K_1^c\lfloor \Xi_i^c(t_k^{c_i})\rceil^{\phi_1^c} + K_2^c\lfloor \Xi_i^c(t_k^{c_i})\rceil^{\phi_2^c}) \tag{40}$$

During the steady state, the auxiliary variable

Omitting the time argument for brevity since $h_i^c$ $$t \in \left[t_k^{c_i c_i}, t_{k+1}^{c_i}\right),$$

will be zero. Consequently, and $\zeta_i^c,$ $$\mathcal{W}_2(t) = \mathcal{W}_2(t_k^{c_i}).$$

Therefore, $$\dot{W}_2 = -\sum_{i=1}^{N} \frac{v_i^c}{\varsigma_i^c} (K_1^c \lfloor \Xi_i^c \rceil^{\phi_1^c} + K_2^c \lfloor \Xi_i^c \rceil^{\phi_2^c}) \tag{41}$$

$$= -\sum_{i=1}^{N} \frac{v_i^c}{\varsigma_i^c} (K_1^c |\Xi_i^c|^{\phi_1^c} \operatorname{sign}(\Xi_i^c) + K_2^c |\Xi_i^c|^{\phi_2^c} \operatorname{sign}(\Xi_i^c))$$

Since $$\Xi_i^c$$

is a function of $$v_i^c,$$

and during steady state sign( $$\Xi_i^c$$

and sign( $$v_i^c$$

will have the same polarity. Therefore, sign( $$(\Xi_i^c)$$

can be replaced with sign( $$(v_i^c)$$

in (41). Moreover, using the property of PPF from (19a), Equation (41) can be upper bounded as:

$$\dot{W}_2 \le -\sum_{i=1}^{N} \frac{v_i^c}{\varsigma_i^c} (K_1^c \gamma^{\phi_1^c} |v_i^c|^{\phi_1^c} \operatorname{sign}(v_i^c) + K_2^c \gamma^{\phi_2^c} |v_i^c|^{\phi_2^c} \operatorname{sign}(v_i^c)) = \tag{42}$$

$$-\sum_{i=1}^{N} \frac{1}{\varsigma_i^c} \left( K_1^C \gamma^{\phi_1^c} |v_i^C|^{\phi_1^c+1} + K_2^C \gamma^{\phi_2^c} |v_i^c|^{\phi_2^c+1} \right) =$$

$$-K_1^C \gamma^{\phi_1^c} \sum_{i=1}^{N} \frac{1}{\varsigma_i^c} (|v_i^c|^2)^{\frac{\phi_1^c+1}{2}} - K_2^C \gamma^{\phi_2^c} \sum_{i=1}^{N} \frac{1}{\varsigma_i^c} (|v_i^c|^2)^{\frac{\phi_2^c+1}{2}} \le$$

$$-K_1^C \gamma^{\phi_1^c} \min\left(\frac{1}{\varsigma_i^c}\right) \sum_{i=1}^{N} (|v_i^c|^2)^{\frac{\phi_1^c+1}{2}} - K_2^C \gamma^{\phi_2^c} \min\left(\frac{1}{\varsigma_i^c}\right) \sum_{i=1}^{N} (|v_i^c|^2)^{\frac{\phi_2^c+1}{2}} \le$$

$$-2^{\frac{\phi_1^c+1}{2}} K_1^c \gamma^{\phi_1^c} \min\left(\frac{1}{\varsigma_i^c}\right) \left(\sum_{i=1}^{N} |v_i^c|^2/2\right)^{\frac{\phi_1^c+1}{2}} -$$

-continued $$2^{\frac{\phi_2^c+1}{2}} n^{\frac{1-\phi_2^c}{2}} K_2^c \gamma^{\phi_2^c} \min\left(\frac{1}{\varsigma_i^c}\right) \left(\sum_{i=1}^{N} |v_i^c|^2/2\right)^{\frac{\phi_2^c+1}{2}} \le$$

$$-\Gamma_1^c (\|v^c\|^2/2)^{\theta_1} - \Gamma_2^c (\|v^c\|^2/2)^{\theta_2} \le -\Gamma_1^c W_2^{\theta_1} - \Gamma_2^c W_2^{\theta_2}$$

where $$\Gamma_j^c = 2^{\frac{\phi_1^c+1}{2}} K_1^c \gamma^{\phi_1^c} \min\left(\frac{1}{\varsigma_i^c}\right) > 0,$$

$$\Gamma_2^c = 2^{\frac{\phi_2^c+1}{2}} n^{\frac{1-\phi_2^c}{2}} K_2^c \gamma^{\phi_2^c} \min\left(\frac{1}{\varsigma_i^c}\right) > 0.$$

Thus, the modulation variable $$v_i^c$$

will converge to zero within FxT. This implies the cost error $$e_i^c(t)$$

will also converge to zero within fixed time since $$v_i^c(t) := e_i^c(t)/\rho_i^c(t)$$

where $$\rho_i^c(t) > 0 \forall \ t > 0,$$

and $$\lim_{t \to \infty} \rho_i^c(t) = \rho_{i,s}^c > 0, \text{ where } \rho_{i,s}^c$$

is a steady state value of APPF.

Unlike the dynamic consensus algorithm, the method of the present disclosure guarantees fixed-time stability. Each DG estimates MG's average voltage using only its local state information and data from neighboring DGs. This estimation is completed within a predefined convergence time. This provides a distinct advantage by significantly accelerating the convergence of the distributed control of the present disclosure through the utilization of the estimated average voltage values.

$$\hat{V}_i = V_i + \int \left( K_1 \sum_{j \in N_i} a_{ij} \lfloor \hat{V}_j - \hat{V}_i \rceil^{\phi_1} + K_2 \sum_{j \in N_i} a_{ij} \lfloor \hat{V}_j - \hat{V}_i \rceil^{\phi_2} \right) dt \tag{43}$$

where the constants $K_1$, $K_2 > 0$, $\phi_1 \in (0,1)$, and $\phi_1 \in (1,2)$.

In this process a distributed voltage regulator is introduced to rapidly restore MG's average voltage to the desired reference, $V_{ref}$, within a prespecified convergence time. This is achieved by having each DG compare its estimated average voltage, $\hat{V}_i$, with the estimates from neighboring DGs, $\hat{V}_j$. At least one DG, known as the dominant DG, has direct access to the nominal voltage. The voltage consensus error for the dominant DG, $$e_i^v,$$

is then calculated by summing the differences between each DG's 112 estimated voltage and those of its neighbors DGs 112, as well as MG's reference voltage.

$$e_i^v(t) = \sum_{j \in N_i} a_{ij}\left(\hat{V}_j\left(t_{k'}^{v_j}\right) - \hat{V}_i\left(y_k^{v_i}\right)\right) + b_i\left(V_{ref} - \hat{V}_i\left(t_k^{v_i}\right)\right) \tag{44}$$

For each $$\hat{V}_i(t),\, t \in \left\{t_k^{v_i} \mid k = 1, 2, \dots \right\},$$

where $$t_k^{v_i}$$

represents the last ET time for voltage of DG$_i$. For each $$t \in \left[t_k^{v_i}, t_{k+1}^{v_i}\right), t_{k'}^{v_j}$$

is the last ET time for voltage of neighboring DG$_j$. The voltage measurement of DG$_i$ and neighboring DG$_j$ gets updated at triggering time $$t_0^{v_i}, t_1^{v_i}, \dots, \text{and } t_0^{v_j}, t_1^{v_j}, \dots,$$

respectively.

Similar to the cost error analysis, integrating the APPF to the voltage error by transforming $$e_i^v$$

into $$\Xi_i^v = \mathcal{M}_i(v_i^v), \text{ where } v_i^v(t) := e_i^v(t)/\rho_i^v(t). \text{ Also, } \dot{\Xi}_i^v(t) = \varpi_i^v(t)(u_i^v(t) + \zeta_i^v(t)),$$

where $$\varpi_i^v(t) > 0 \text{ and } \zeta_i^v(t) \geq 0$$

is associated with voltage error $$e_i^v(t).$$

The ET-based APPF-FxT control scheme of the present disclosure for the voltage regulator is defined as $$u_i^v(t) = \frac{\bar{u}_i^v(t)}{\varpi_i^v(t)} - \zeta_i^v(t); t \in \left\{t_k^{v_i} \mid k = 0, 1, \dots\right\} \tag{45}$$

$$\text{where } \bar{u}_i^u(t) = -K_1^v\left\lfloor\Xi_i^v\left(t_k^{v_i}\right)\right\rfloor^{\phi_1^v} - K_2^v\left\lfloor\Xi_i^v\left(t_k^{v_i}\right)\right\rfloor^{\phi_2^v}, \tag{46}$$

$$K_1^v, K_2^v > 0,$$

are voltage controller gains, $$\phi_1^v \in (0, 1), \text{ and } \phi_2^v \in (1, 2).$$

Defining an intermediate measurement error $$E_i^v(t)$$

as $$E_i^v(t) = -K_1^v\left\lfloor\Xi_i^v\left(t_k^{v_i}\right)\right\rfloor^{\phi_1^v} \tag{47}$$
$$- K_2^v\left\lfloor\Xi_i^v\left(t_k^{v_i}\right)\right\rfloor^{\phi_2^v}$$
$$+ K_1^v\left\lfloor\Xi_i^v(t)\right\rfloor^{\phi_1^v}$$
$$+ K_2^v\left\lfloor\Xi_i^v(t)\right\rfloor^{\phi_2^v}$$

$$\text{where } t \in \left\{t_k^{v_i}, t_k^{v_i} + \delta, \dots, t_{k+1}^{v_i} + \delta\right\}.$$

Theorem2: Given the connected undirected cyber graph G, the ET based APPF-FxT voltage regulation control (45) of the present disclosure forces $$\Xi_i^v$$

of all DGs to zero within fixed time. Moreover, the voltage error $$e_i^v$$

will also be confined within the prescribed performance boundary. The voltage measurement will get updated to the controller under the following triggering conditions:

$$t_{k+1}^v = \min\{t \geq t_k^v : |E_i^v(t)| \tag{48}$$
$$\geq \varepsilon_1^v K_1^v\left|\Xi_i^v(t)\right|^{\phi_1^v}$$

25

-continued $$+\varepsilon_2^y K_2^y \lceil \Xi_i^y(t) \rvert^{\phi_2^y} \}, k$$

$$= 0, 1, 2, \ldots$$

where $\varepsilon_1^y, \varepsilon_2^y \in (0, 1)$.

Following the same steps as in the proof of Theorem 1, the convergence of $$\Xi_i^y(t) \text{ and } v_i^y(t)$$

is established within fixed time.

The measurement of IC and voltage individual DGs are sampled with a period of $\delta > 0$, implying that the inter-event time is lower bounded by at least a positive value $\delta$. In mathematical terms, inter-event time, $T_k := t_{k+1} - t_k$, will always be greater than a non-zero positive value $\delta$. Consequently, based on the definition of Zeno behavior, the ET mechanism for both IC and voltage regulator prevents Zeno behavior.

FIG. 2 shows a flow diagram of a method 200 for distributed control of a direct current (DC) microgrid having a plurality of distributed generators (DGs) coupled to a DC bus through a plurality of converters.

The method for distributed control of a direct current (DC) microgrid is initiated. The DC microgrid comprises the plurality of distributed generators (DGs) 112-1, 112-2, . . . , 112-N, each coupled to a common DC bus 110 through a corresponding converter 114-1, 114-2, . . . , 114-N. Each DG 112 includes a local controller, a voltage and current measurement unit, and a communication interface coupled to a communication network for exchanging information with one or more neighbouring DGs. The distributed control method enables all DGs 112 to coordinate autonomously for maintaining bus voltage stability and achieving economic power dispatch, without reliance on a centralized supervisory unit.

At step 202, the method measures the local voltage and local current of each DG 112 using the local measurement unit. The local measurement unit senses the terminal voltage at the converter output and the DC bus current flowing into the microgrid. These locally measured quantities are transmitted to the controller, which uses them to determine the DG's operational state. The measured data form the primary input to the distributed estimation and control process.

The method computes, using the distributed voltage observer and neighbor information received via the communication network, the local estimate of an average bus voltage of the DC microgrid. The distributed voltage observer is implemented in each controller and executes an estimation algorithm that combines its own measured voltage with estimated average voltages received from neighboring DGs 112. The distributed voltage observer updates its estimate iteratively based on consensus dynamics, such that all DGs 112 converge to a common approximation of the bus average voltage without requiring a central estimator. This local estimate forms a key feedback input for voltage regulation.

In an embodiment, computing the local estimate of the average bus voltage in the distributed voltage observer comprises pinning at least one DG 112 to the nominal bus voltage. The pinned DG 112 serves as an anchor node or reference voltage point, ensuring that the overall observer estimates converge toward the nominal voltage level and mitigating drift in distributed estimation.

At step 204, the method determines the incremental cost (IC) consensus error based on differences between a local IC and ICs of neighboring DGs obtained from the neighbor information, and determines a bus voltage regulation error based on the difference between the estimated average bus voltage and a nominal bus voltage. Each DG 112 maintains a cost function representing its power generation characteristics. The controller computes the IC by differentiating this cost function with respect to its output power. The IC consensus error quantifies the deviation between the local IC and the average of neighboring ICs, while the voltage regulation error represents the deviation between the estimated average voltage and the nominal reference. These two error quantities drive the distributed control logic.

In an embodiment, the neighbor information comprises the ICs of neighboring DGs, voltage-observer variables including estimated average-voltage values, and last event timestamps. The inclusion of the last event timestamp ensures synchronization of asynchronous updates and maintains consistency in distributed voltage estimation across all communicating nodes.

At step 206, the method applies an adjustable prescribed performance function (APPF) to maintain the IC consensus error and the bus voltage regulation error within time-varying performance bounds. The APPF defines upper and lower limits that evolve dynamically over time to control the transient and steady-state behaviors of both errors. The APPF is parameterized to adjust its bounds according to load changes, ensuring that the control system maintains both fast convergence and stability. The APPF transforms each raw error into a normalized form suitable for subsequent control computation.

In an embodiment, applying the APPF further comprises adjusting the time-varying performance bounds during transient intervals of the IC consensus error and the bus voltage regulation error. The APPF dynamically modifies its upper and lower limit parameters in response to operating changes, such as load disturbances, ensuring that both errors remain bounded within allowable margins while preventing overshoot or instability during fast transient responses.

At step 208, the method computes control inputs from the IC consensus error and the voltage regulation error using a controller configured to achieve convergence within a fixed time independent of the initial values of the errors. The controller applies nonlinear control laws derived from fixed-time Lyapunov stability theory, ensuring that convergence occurs within a pre-determined bounded time irrespective of the starting conditions. The output of controller is a control signal used to adjust the droop reference of the converter 114, coordinating voltage and power sharing among all DGs.

In an embodiment, the method computes the control inputs in the controller 116 comprises satisfying a Lyapunov stability function to guarantee fixed-time convergence. The Lyapunov function establishes a negative-definite derivative condition, ensuring that the system trajectories converge to equilibrium points within a predetermined fixed time, independent of initial error magnitudes.

At step 210, the method transmits the updated neighbor information over the communication network using an event trigger mechanism configured to initiate transmission when the triggering condition is satisfied. Each DG 112 continuously monitors its local IC and estimated average voltage and determines whether the deviation from the last transmitted state exceeds a predetermined threshold. When this triggering condition is met, the controller initiates a broadcast of the updated neighbor information, including its local IC, estimated average voltage, and timestamp. The event trigger mechanism thereby reduces unnecessary communication and optimizes network bandwidth utilization.

In an embodiment, the method further comprises transforming the IC consensus error and voltage regulation error into transformed errors and mapping them using a monotone mapping function that diverges as the corresponding error approaches the boundary of its performance limits. This transformation enforces boundary constraints by amplifying the control response near limit thresholds, ensuring that performance bounds are not violated.

In an embodiment, the method transmits the updated neighbor information via the event trigger mechanism further enforces a positive minimum inter-event time to prevent Zeno behavior. The mechanism includes a dwell-time constraint that ensures that two consecutive communication events are separated by at least the minimum interval. This constraint prevents infinitely fast triggering events that could otherwise cause instability or overload communication links.

In an embodiment, the triggering condition comprises comparing the deviation between the current communicated state value, selected from either the local IC or the estimated average bus voltage value, and the last transmitted state value to the predetermined threshold. When the deviation exceeds the threshold, the event trigger mechanism activates and transmits the updated neighbor information, ensuring that only significant changes trigger communication.

At step 212, the method updates the droop reference of each converter 114 to equalize the ICs of all DGs 112 subject to their respective power limits and to regulate the estimated average bus voltage toward the nominal bus voltage. The droop reference acts as the target voltage within the inner voltage loop of the converter's primary droop controller. By dynamically adjusting the droop reference according to the control input, each converter 114 modulates its power output contribution, achieving equalized ICs and bus voltage regulation in a fully distributed manner.

In an embodiment, equalizing the ICs among DGs 112 further comprises realizing economic dispatch while enforcing DG power limits by holding any constrained DG at the generation limit. When the DG reaches its maximum or minimum power constraint, its IC becomes fixed, and neighboring DGs automatically redistribute load adjustments to maintain consensus and overall economic balance.

In an embodiment, computing the IC in the controller comprises differentiating a differentiable generation-cost function with respect to the DG's output power. This derivative yields the marginal cost of power production, forming the local IC input used in consensus computations and dispatch optimization.

In an embodiment, updating the droop reference comprises supplying it to the inner voltage loop of the primary droop controller of the converter 114. The primary droop controller adjusts terminal voltage of the converter 114 according to the droop reference, thus ensuring coordinated power sharing and maintaining DC bus stability across the DC microgrid.

In an embodiment, the method further comprises maintaining boundedness of the IC consensus error and the bus voltage regulation error within the time-varying performance bounds of the APPF during load disturbances. Even under rapid load variations, the APPF ensures that both errors remain strictly confined within prescribed envelopes, guaranteeing smooth and stable system operation.

To validate the performance of the control structure of the present disclosure, a simulated 200 V DC MG is implemented using PLECS platform. The microgrid comprises four DGs, each modeled as DC-DC boost converter. The operating cost parameters provided for the DGs, as well as the transmission line parameters interconnecting them to the DC bus, are provided in TABLE I. Additionally, the designed control parameters used in the simulation are summarized in TABLE I. The parameters of used APPF are $\wp_i=50$, $\rho_{i,0}=1$, $\in=0.2$, $\rho_{i,s}=0.05$, $\breve{\mu}_i=1$, $\beta_{min}=10$, $\beta_{max}=1000$, and $\alpha_i=1$. The sampling period is $\delta=1$ μs. The communication graph's connectivity is represented by the adjacent matrix $\mathcal{A}=[0,1,1,1;1,0,1,1;1,1,0,1;1,1,1,0]\in\mathbb{R}^{4\times4}$ Furthermore, $DG_1$ is designated as the pinning DG getting the nominal voltage of the MG, which is highlighted through the diagonal pinning matrix configured as $\mathcal{B}=\text{diag}\{1,0,0,0\}$.

TABLE I

| DC MG's PARAMETERS | | | | | | | |
|---|---|---|---|---|---|---|---|
| DGs production costs | | | | | | | |
| DG | $c_i(\cent)$ | $b_i(\cent/W)$ | $a_i(\cent/W^2)$ | $P_i^{min}(W)$ | $P_i^{max}(W)$ | | |
| $DG_1$ | 95 | 0.64 | 0.013 | 120 | −120 | | |
| $DG_2$ | 75 | 0.59 | 0.008 | 400 | 50 | | |
| $DG_3$ | 85 | 0.62 | 0.011 | 500 | 65 | | |
| $DG_4$ | 80 | 0.60 | 0.009 | 500 | 85 | | |
| Boost converter Parameters | | | | | | | |
| $V_{in}$ | | $F_{SW}$ | | $L_f$ | | $C_f$ | |
| 100 V | | 10 KHZ | | 3.3 mH | | 470 μF | |
| Transmission lines parameters | | | | | | | |
| R | | | L | | | C | |
| 0.2 Ω | | | 50 μH | | | 30 nF | |
| Controller parameters | | | | | | | |
| $K_1^c$ | $K_2^c$ | $K_1^v$ | $K_2^v$ | $\phi_1^c$ | $\phi_2^c$ | $\phi_1^v$ | $\phi_2^v$ |
| 1 | 1 | 1 | 1 | 0.5 | 1.5 | 0.5 | 1.5 |

FIG. 5 illustrates the effectiveness of the control strategy of the present disclosure in managing load variations. The developed control mechanism ensures that all distributed generators (DGs) achieve coordinated incremental cost (IC) alignment and optimal power sharing under varying load conditions. The X-axis across all sub-figures represents Time (s), while the Y-axis represents the specific measurement variable corresponding to each control metric.

Figure 5A:
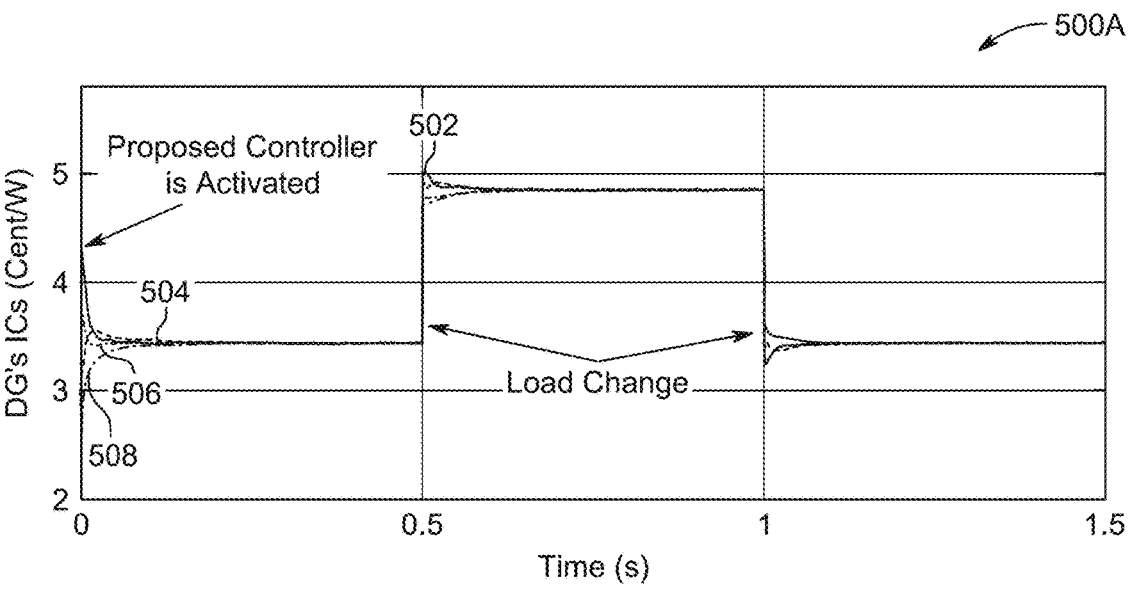
FIG. 5(A) depicts a graphical representation of the variation in the incremental cost (IC) of multiple DGs ($DG_1$-$DG_4$), plotted against time, in accordance with embodiments of the present disclosure

FIG. 5(A) depicts a graphical representation 500A of the variation in the incremental cost (IC) of multiple DGs ($DG_1$-$DG_4$), plotted against time, in accordance with embodiments of the present disclosure. The Y-axis represents IC ($\cent/MW$). The curves labeled as bars 502, 504, 506, and 508 correspond to $DG_1$, $DG_2$, $DG_3$, and $DG_4$, respectively. The controller of the present disclosure ensures convergence of all DGs' ICs to a common equilibrium point, indicating economic coordination among DGs. At t=0.5 s, a step increase in total load results in an immediate deviation in ICs, which are then realigned within a short settling period. Similarly, at t=1.0 s, the load decrease triggers a reconfiguration of ICs, restoring them to their prior optimal equilibrium levels.

Figure 5B:
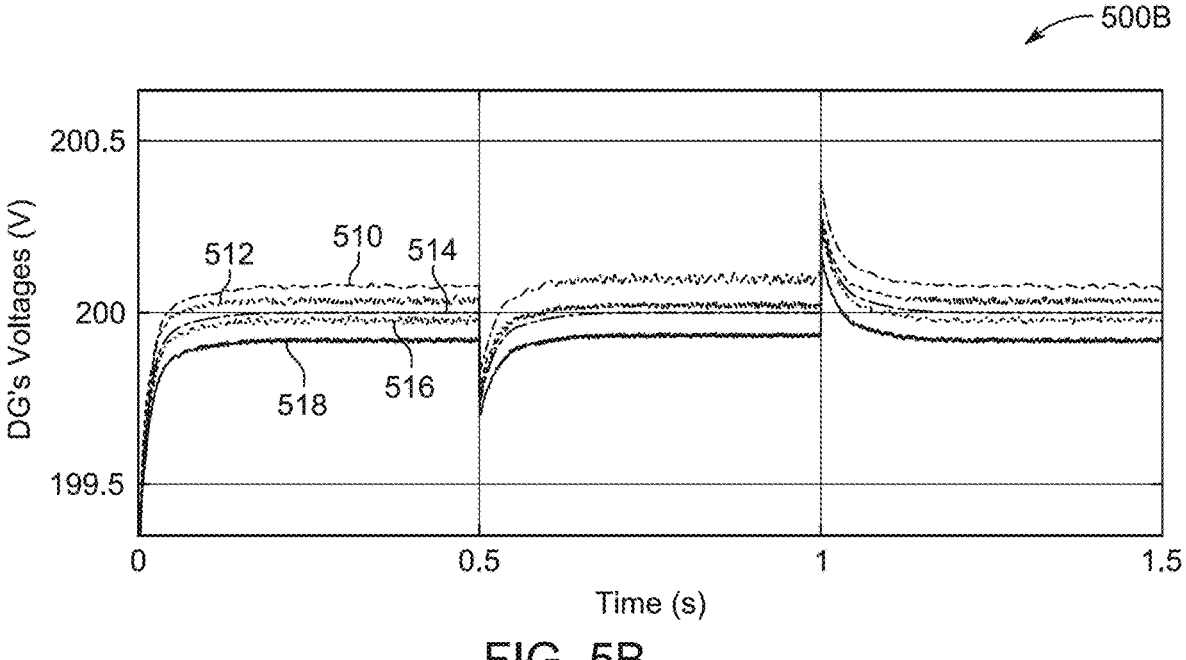
FIG. 5(B) depicts a graphical representation of the voltage profiles of the DGs during the same interval plotted against time, in accordance with embodiments of the present disclosure.

FIG. 5(B) depicts a graphical representation 500B of the voltage profiles of the DGs during the same interval plotted against time, in accordance with embodiments of the present disclosure. The Y-axis represents DG voltages (V). The bars 510, 512, 516, 518 correspond to the voltage responses of DG$_1$-DG$_4$, respectively. The figure demonstrates that the MG's average voltage is maintained at bar 514 near its nominal value of 200 V, validating voltage stability under both loading and unloading events.

Figure 5C:
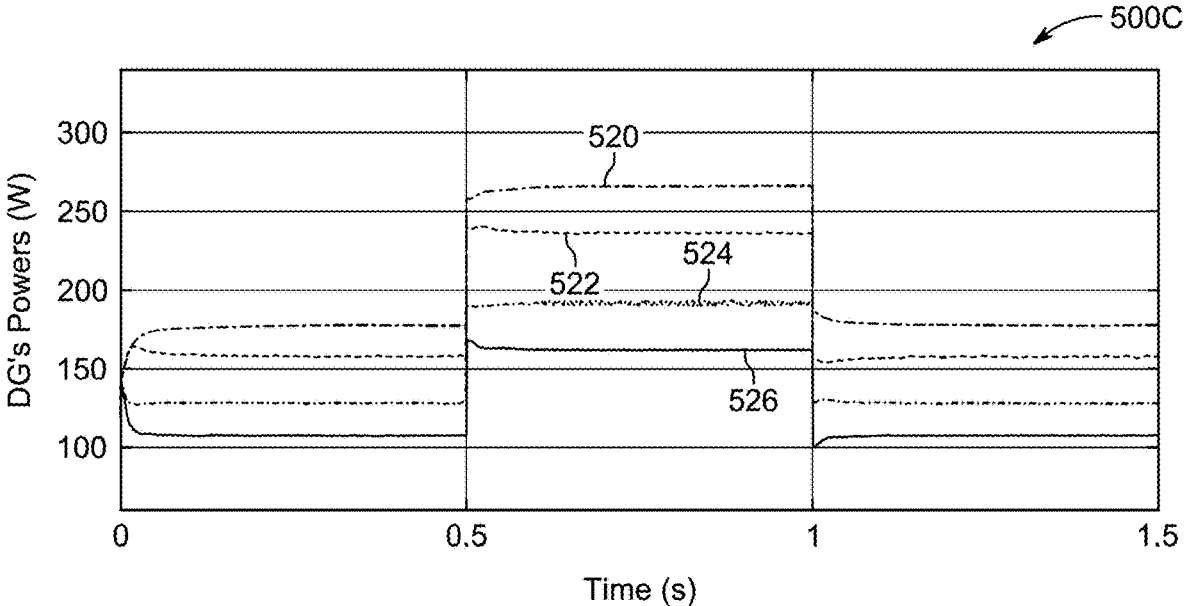
FIG. 5(C) depicts a graphical representation of the active power outputs of the DGs plotted against time, in accordance with embodiments of the present disclosure.

FIG. 5(C) depicts a graphical representation 500C of the active power outputs of the DGs plotted against time, in accordance with embodiments of the present disclosure. The Y-axis represents DG power (W). The bars 520, 522, 524, 526 correspond to the real power outputs of DG$_1$-DG$_4$, respectively. The controller of the present disclosure dynamically adjusts the power outputs during load changes (at 0.5 s and 1.0 s), ensuring that total generation consistently meets the instantaneous load demand.

Figure 5D:
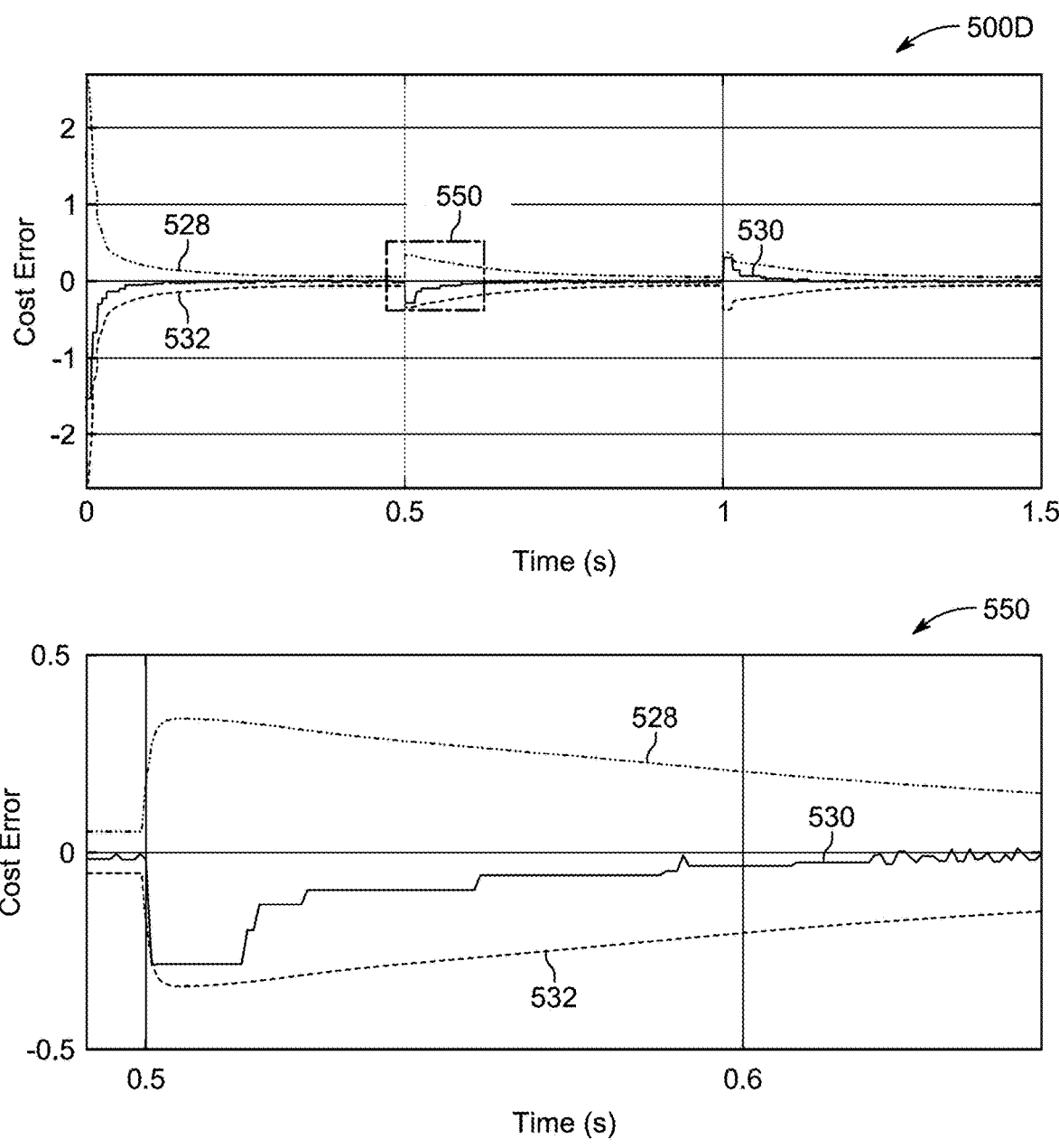
FIG. 5(D) depicts a graphical representation of the incremental cost error ($\varepsilon^c$) over time plotted against time, in accordance with embodiments of the present disclosure.

FIG. 5(D) depicts a graphical representation 500D of the incremental cost error ($\varepsilon^c$) over time plotted against time, including an enlarged view 550, in accordance with embodiments of the present disclosure, where the Y-axis denotes Cost Error (¢/MW). Bars 528, 530, 532 represent the deviation of the actual IC from its reference value. The transient spike at t=0.5 s reflects the immediate response to load increase, after which the error quickly diminishes to near zero, demonstrating effective cost convergence and stability.

Figure 5E:
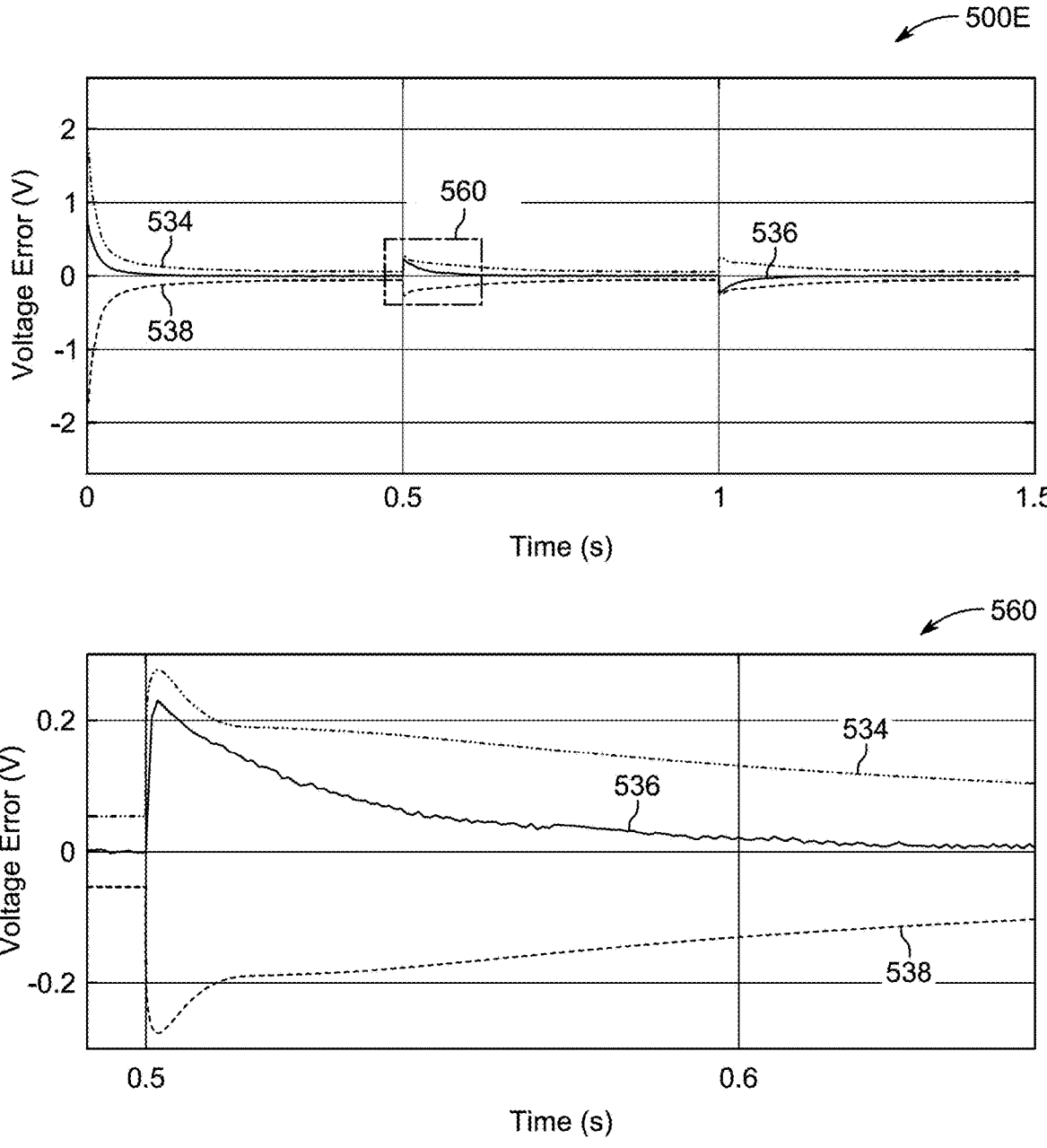
FIG. 5(E) depicts a graphical representation of the voltage error ($\varepsilon^v$) plotted against time, in accordance with embodiments of the present disclosure.

FIG. 5(E) depicts a graphical representation 500E of the voltage error ($\varepsilon^v$) plotted against time, including an enlarged view 560, in accordance with embodiments of the present disclosure, with the Y-axis denoting Voltage Error (V). Bars 534, 536, 538 correspond to the deviation between the measured voltage and its nominal value. The small and bounded voltage error throughout the simulation period indicates precise voltage regulation capability of the control mechanism of the present disclosure.

Figure 5F:
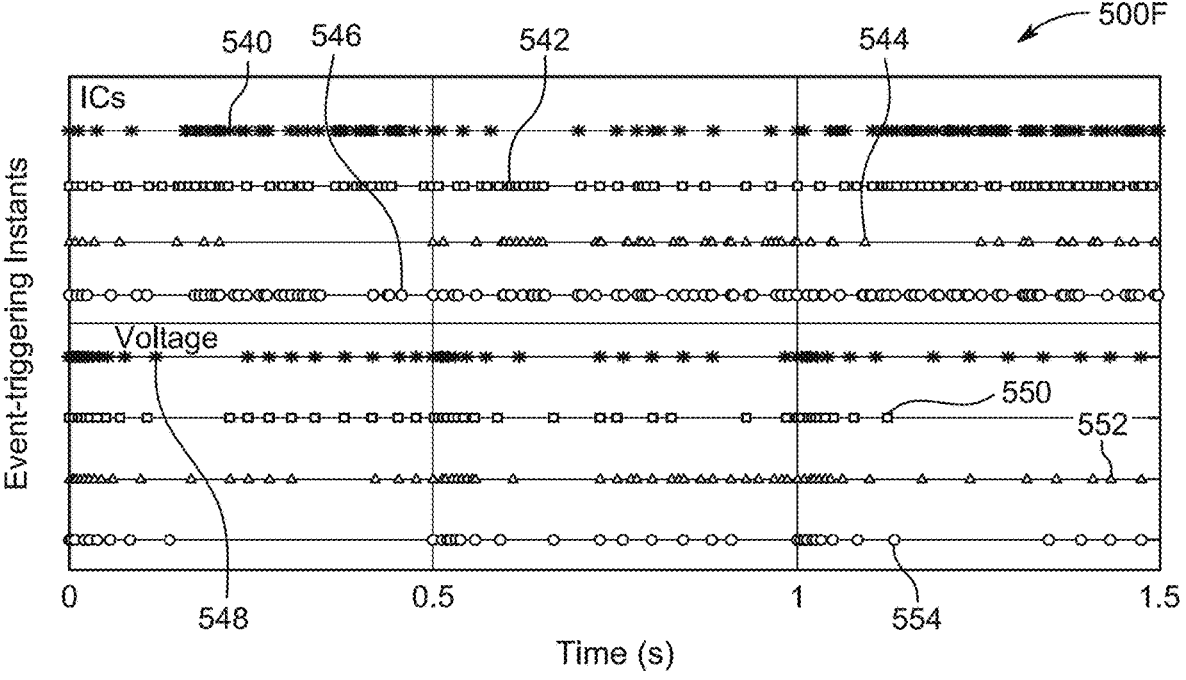
FIG. 5(F) depicts a graphical representation of the event-triggering instants plotted against time, in accordance with embodiments of the present disclosure.

FIG. 5(F) depicts a graphical representation 500F of the event-triggering instants plotted against time, in accordance with embodiments of the present disclosure, also referred to as the inter-update times, for both the IC and voltage variables of each DG. The X-axis represents Time (s), and the Y-axis indicates the triggering instances for each DG's voltage and IC updates. Bars 540, 542, 544, 546 correspond to DG$_1$-DG$_4$ voltage updates, while bars 548, 550, 552, 554 correspond to DG$_1$-DG$_4$ IC updates. It can be observed that the triggering instants are aperiodic and do not accumulate within any finite time interval, thereby confirming Zeno-free behaviour under the event-triggered (ET) control scheme of the present disclosure.

FIG. 6 illustrates a comparative analysis between the Adaptive Prescribed Performance Function-Event Triggered-Fixed-time (APPF-ET-FxT) controller of the present disclosure and the conventional Prescribed Performance Function-Event Triggered-Fixed-time (PPF-ET-FxT) controller in terms of control input behavior and control effort optimization. Both controllers are evaluated under identical operating conditions to demonstrate the performance efficiency of the control strategy of the present disclosure. The X-axis across both sub-figures represents Time (s), while the Y-axis represents the respective control variable.

Figure 6A:
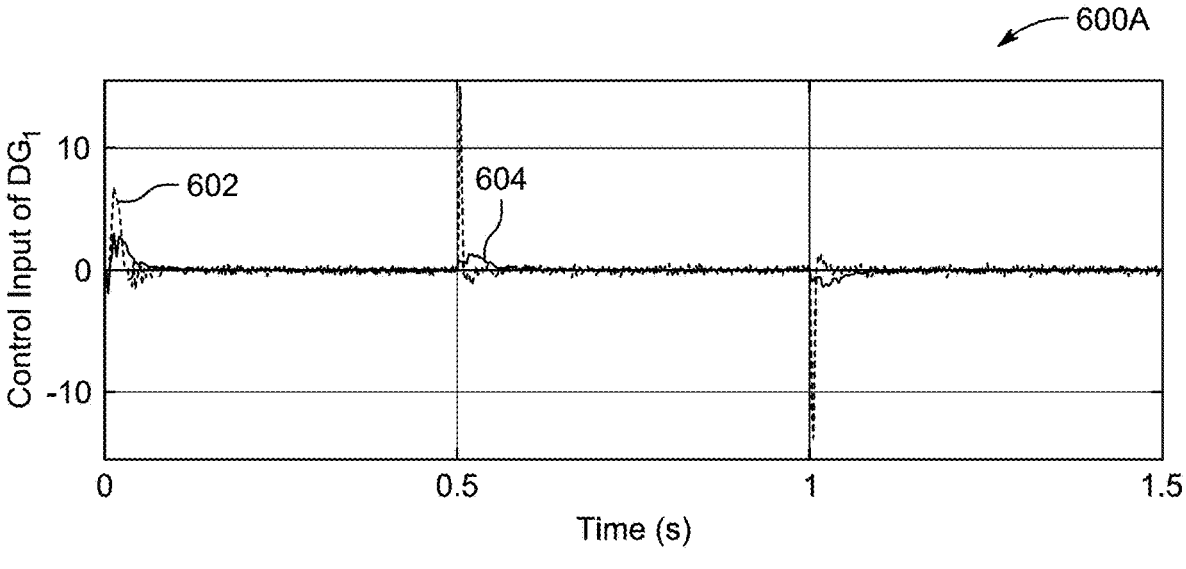
FIG. 6(A) depicts a graphical representation of the control input of $DG_1$ over time, in accordance with embodiments of the present disclosure.

FIG. 6(A) depicts a graphical representation 600A of the control input of DG$_1$ over time, in accordance with embodiments of the present disclosure. The Y-axis denotes Control Input (arbitrary units). Bar 602 corresponds to the control trajectory generated by the conventional PPF-ET-FxT controller, whereas bar 604 represents the control trajectory of the APPF-ET-FxT controller of the present disclosure. It is observed that the APPF-ET-FxT controller exhibits smoother transients and significantly reduced control signal oscillations compared to the conventional approach. Notably, at t=0.5 s, the system experiences a load increase, and the controller (bar 504) rapidly stabilizes without overshoot, demonstrating superior adaptability and fixed-time convergence. Similarly, after the load reduction at t=1.0 s, the control signal promptly returns to its nominal level, reaffirming the robustness of the mechanism of the present disclosure.

Figure 6B:
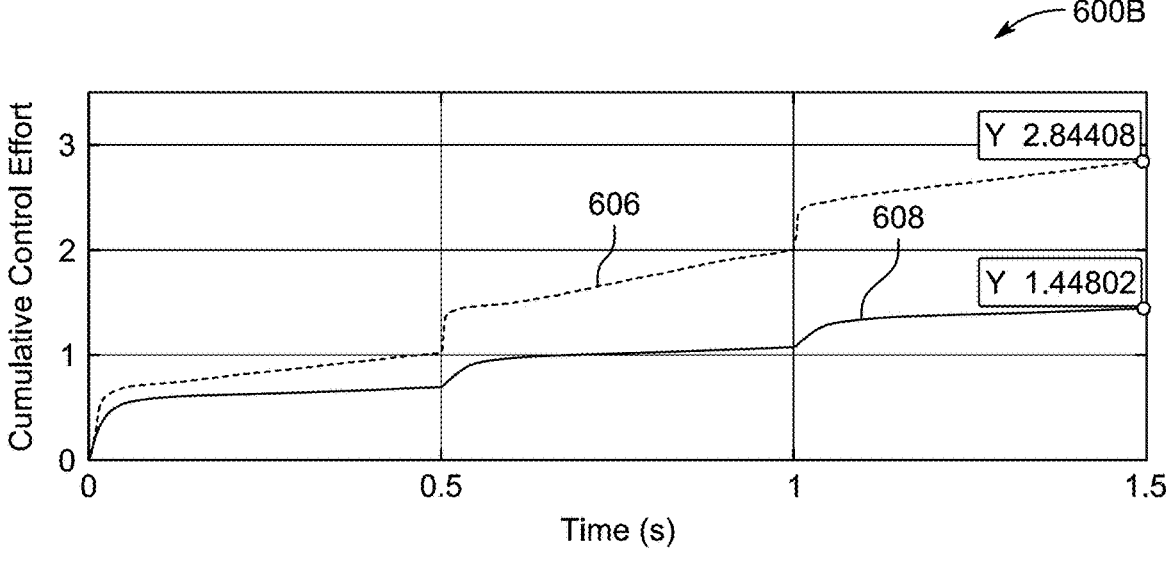
FIG. 6(B) depicts a graphical representation of the cumulative control effort comparison between the two controllers, in accordance with embodiments of the present disclosure.

FIG. 6(B) depicts a graphical representation 600B of the cumulative control effort comparison between the two controllers, in accordance with embodiments of the present disclosure. The Y-axis denotes Cumulative Control Effort (arbitrary units). Bar 606 corresponds to the cumulative effort of the PPF-ET-FxT controller, while bar 608 represents the effort of the APPF-ET-FxT controller. The plot reveals that the APPF-ET-FxT controller requires substantially less cumulative effort over the entire simulation horizon, indicating improved energy efficiency and reduced actuator burden. Moreover, a quantitative comparison of the control effort is provided using the cumulative control effort (CCE) measure, defined as, $$CCE = \sum_{i=1}^{4} \int_0^T |V_i^{nom}(s)| ds.$$

The time history of the CCE for both PPF approaches is illustrated in FIG. 6(*b*), clearly demonstrating that the APPF of the present disclosure requires less control effort than the conventional PPF. The lower cumulative value demonstrates that the adaptive design effectively minimizes unnecessary control activations while maintaining high tracking accuracy.

Overall, FIG. 6(A)-6(B) substantiates that the APPF-ET-FxT controller achieves faster settling, lower oscillations, and reduced total control expenditure compared to the PPF-ET-FxT controller. The results confirm that the adaptive structure of the present disclosure enhances both dynamic performance and control economy without sacrificing convergence guarantees or stability margins.

FIG. 7 illustrates the performance of the distributed control mechanism of the present disclosure when the power generation limits of the distributed generators DG$_1$, DG$_2$, DG$_3$, and DG$_4$, are taken into consideration. The results confirm that the controller dynamically enforces generation constraints while preserving incremental-cost (IC) consensus and maintaining voltage regulation within the microgrid. The X-axis across all sub-figures represents Time (s), whereas the Y-axis denotes the corresponding control variable specific to each plot.

Figure 7A:
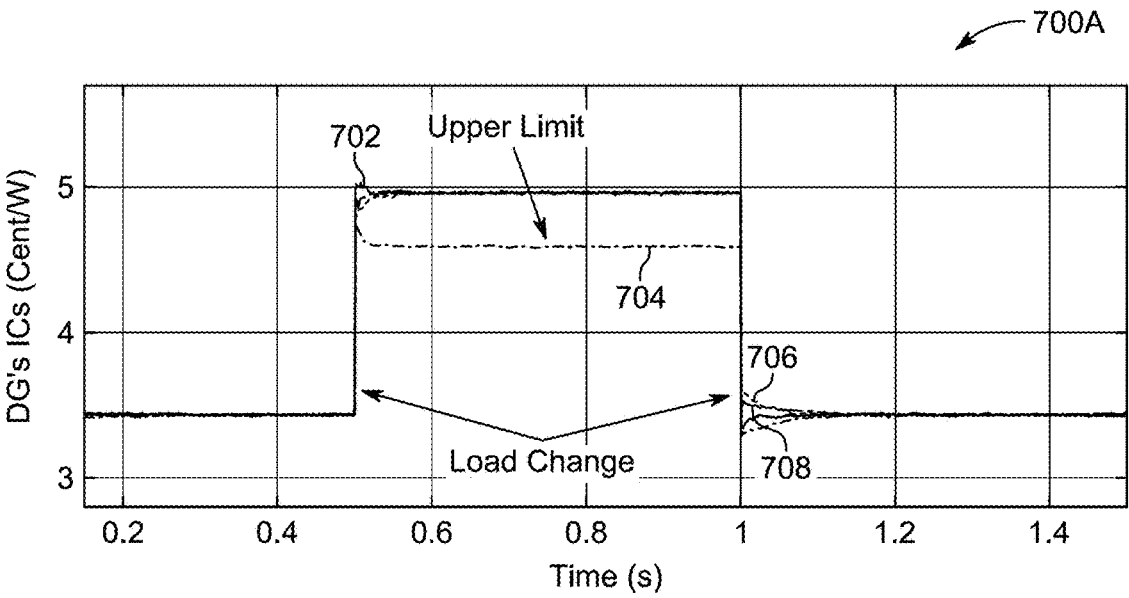
FIG. 7(A) depicts a graphical representation of the ICs of the DGs plotted against time, in accordance with embodiments of the present disclosure.

FIG. 7(A) depicts a graphical representation 700A of the ICs of the DGs plotted against time, in accordance with embodiments of the present disclosure. The Y-axis indicates the Incremental Cost (IC) (¢/W). Bars 702, 704, 706, 708 correspond to DG$_1$, DG$_2$, DG$_3$, and DG$_4$. At the start of operation, all DGs exhibit equalized ICs, indicating economic equilibrium. At t=0.5 s, a load increase occurs, prompting the controller to re-distribute generation among the DGs. During this interval, DG$_2$ reaches its maximum generation limit, and its IC saturates at $\xi_2\hat{}max$=4.59 ¢/W, while the remaining DGs adjust their ICs to a new optimal equilibrium of $\xi$=4.98 ¢W*. The presence of upper-limit markers on each curve demonstrates that the controller enforces generation boundaries while sustaining IC consensus among non-saturated DGs.

Figure 7B:
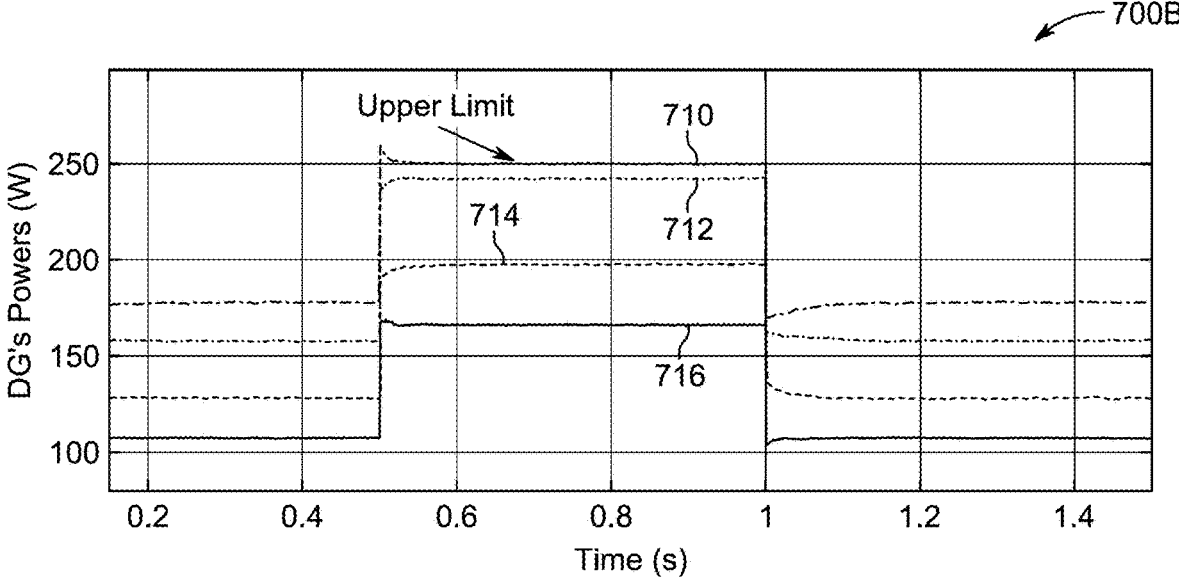
FIG. 7(B) depicts a graphical representation of the DG power outputs ($P_1$, $P_2$, $P_3$, $P_4$) plotted against time, in accordance with embodiments of the present disclosure.

FIG. 7(B) depicts a graphical representation 700B of the DG power outputs ($P_1$, $P_2$, $P_3$, $P_4$) plotted against time, in accordance with embodiments of the present disclosure. The Y-axis represents Power (W). Bars 710, 712, 714, 716 correspond to $DG_1$, $DG_2$, $DG_3$, and $DG_4$. Initially, each DG operates near its optimal dispatch point determined by equal ICs. When the load increases at t=0.5 s, the controller redistributes the generation effort such that $DG_2$ attains its maximum rated output of 250 W, as indicated by the plateau at its upper limit. Other DGs compensate proportionally to maintain the overall balance between supply and demand. Subsequently, when the load returns to its nominal level at t=1.0 s, $DG_2$ transitions back from saturation and resumes normal operation, while the remaining DGs adjust correspondingly to restore the initial equilibrium condition.

Figure 7C:
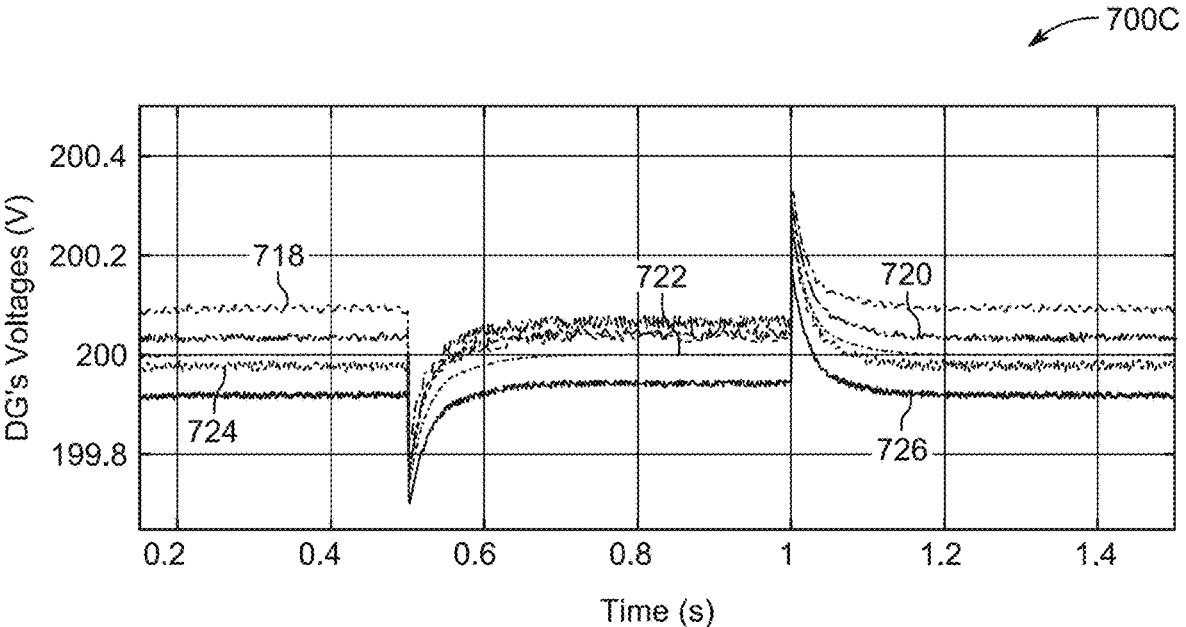
FIG. 7(C) depicts a graphical representation of the voltages of the $DG_1$-$DG_4$ plotted against time, in accordance with embodiments of the present disclosure.

FIG. 7(C) depicts a graphical representation 700C of the voltages of the $DG_1$-$DG_4$ plotted against time, in accordance with embodiments of the present disclosure. The Y-axis denotes Voltage (V). Bars 718, 720, 724, 726 correspond to $DG_1$, $DG_2$, $DG_3$, and $DG_4$, respectively, and bar 722 to the average microgrid voltage. The plot demonstrates that despite transient load changes at t=0.5 s and t=1.0 s, the average bus voltage remains tightly regulated around its nominal value of 200 V, confirming the voltage-stabilizing capability of the control architecture.

In summary, FIG. 7(A)-7(C) collectively validate that the distributed control strategy of the present disclosure maintains IC equilibrium, enforces individual DG power constraints, and regulates bus voltage within a fixed-time convergence framework. The results highlight the controller's capability to dynamically adapt to varying demand scenarios while ensuring stable and economical operation of the DC microgrid.

FIG. 8 illustrates the robustness of the distributed control framework of the present disclosure under conditions of cyber and physical disruptions. The plots validate that the control strategy maintains incremental-cost (IC) synchronization and voltage regulation, and achieves balanced power allocation despite communication interruptions and generator disconnections. Across all sub-figures, the X-axis represents Time (s), while the Y-axis corresponds to the respective measured quantity of the distributed generators (DGs) and the microgrid.

Figure 8A:
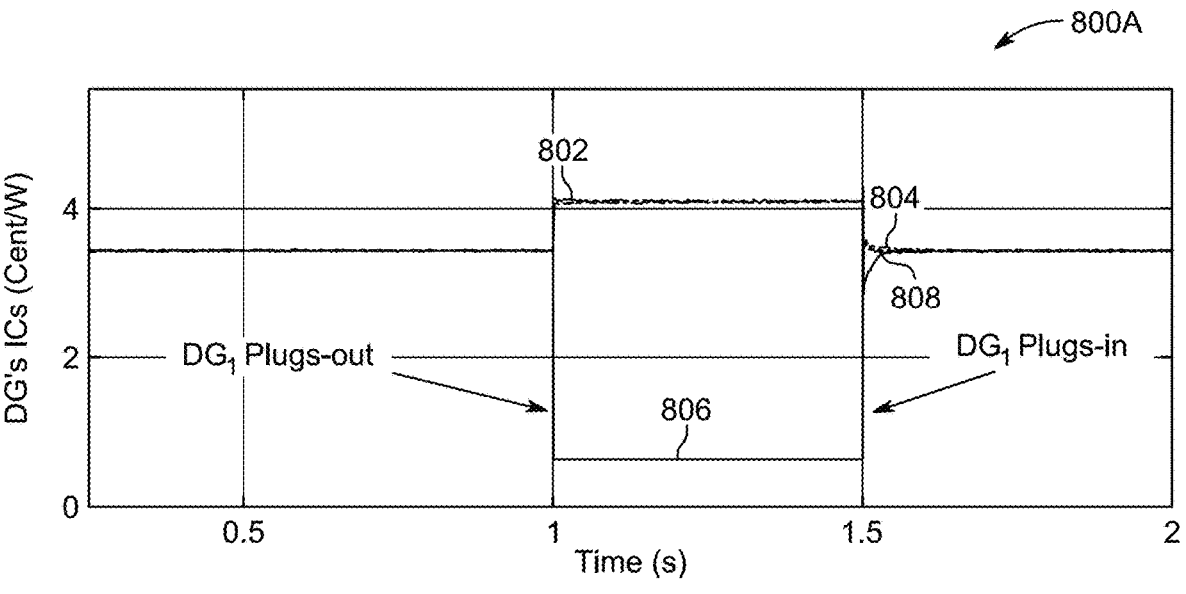
FIG. 8(A) presents a graphical representation of the Incremental Costs (ICs) of the $DG_1$-$DG_4$ plotted against time, in accordance with embodiments of the present disclosure.

FIG. 8(A) presents a graphical representation 800A of the Incremental Costs (ICs) of the $DG_1$-$DG_4$ plotted against time. The Y-axis indicates the Incremental Cost (IC) (cent/W). Bars 802, 804, 806, 808 correspond to $DG_1$, $DG_2$, $DG_3$, and $DG_4$, respectively. The plot demonstrates the successful synchronization of all DGs' ICs toward the optimal economic equilibrium, despite the occurrence of significant disruptions. At t=0.5 s and t=1.0 s, the ICs experience brief transients but quickly converge back to the consensus value within the fixed time guarantee, showcasing the controller's rapid recovery capability.

Figure 8B:
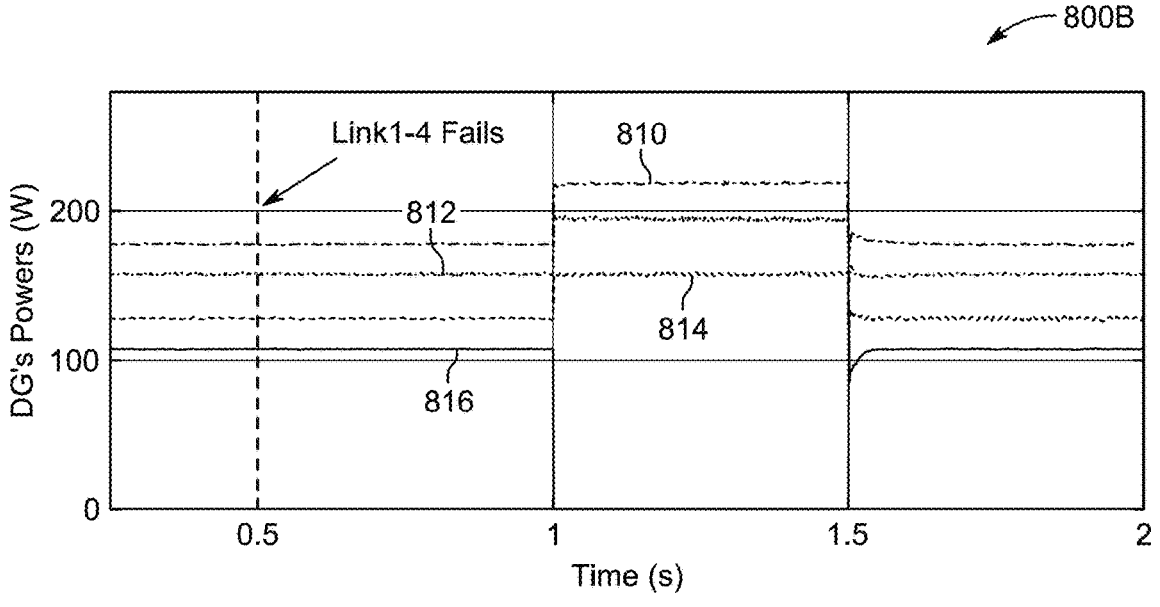
FIG. 8(B) depicts a graphical representation of the Power Output of the DGs (P1, P2, P3, P4) plotted against time, in accordance with embodiments of the present disclosure.

FIG. 8(B) depicts a graphical representation 800B of the Power Output of the DGs (P1, P2, P3, P4) plotted against time. The Y-axis represents Power (W). Bars 810, 812, 814, 816 correspond to $DG_1$, $DG_2$, $DG_3$, and $DG_4$, respectively. The robustness test begins at t=0.5 s, where a disconnection occurs in the cyber link between $DG_1$ and $DG_4$. Despite this interruption in the communication graph, all DGs successfully maintain optimal power allocation to meet the required load, as the power trajectories remain stable, indicating resilience to cyber-attacks or link failures. The test continues at t=1 s, where $DG_1$ is physically unplugged from the MG.

This major physical disruption triggers the remaining active DGs to dynamically and rapidly adjust their generation to instantaneously compensate for the lost power and maintain overall supply-demand balance. Later, $DG_1$ is plugged-into the MG (rejoins the system). The remaining DGs, including the returning $DG_1$, promptly and proportionally reschedule their power outputs to achieve the optimal load distribution determined by the equalized ICs, confirming the system's robust plug-and-play capability.

Figure 8C:
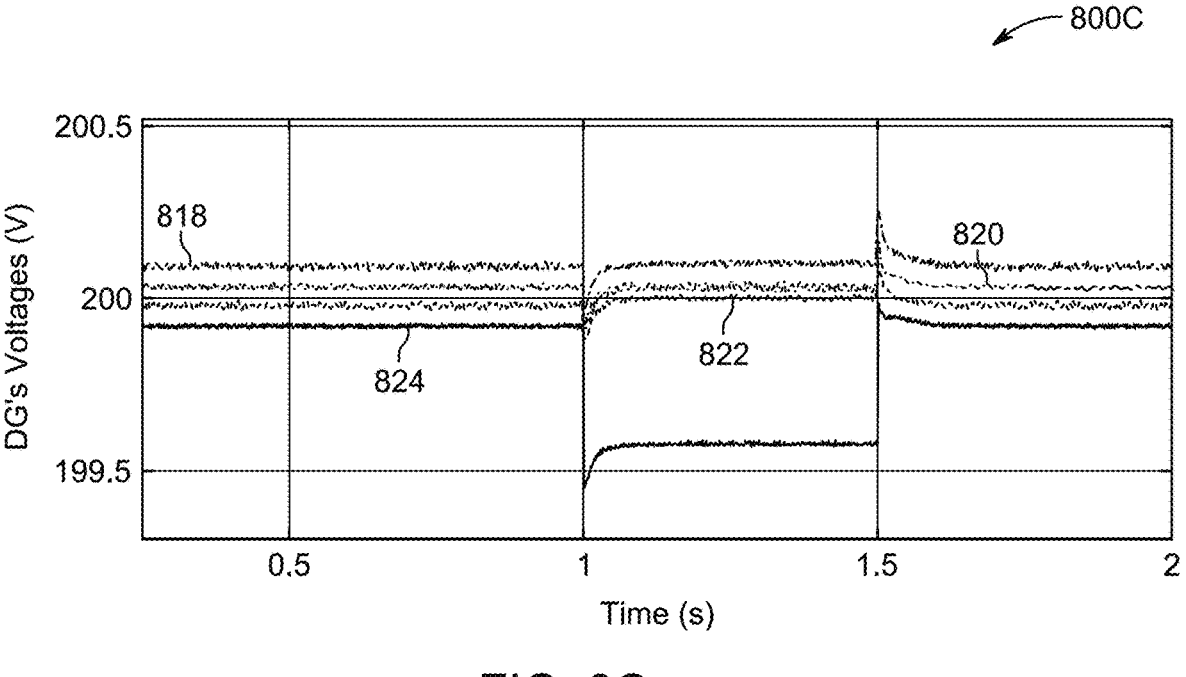
FIG. 8(C) shows a graphical representation of the Average DC Bus Voltage (Vavg) plotted against time, in accordance with embodiments of the present disclosure.

FIG. 8(C) shows a graphical representation 800C of the Average DC Bus Voltage (Vavg) plotted against time. The Y-axis denotes Voltage (V). Bars 818, 820, 822, 824 corresponds to the average microgrid voltage trajectory. The plot demonstrates that the average voltage is effectively synchronized to its nominal value of 200V and remains tightly regulated. Transient deviations are minimal and short-lived following the disconnection of the cyber link (t=0.5 s) and the major DG plug-out/in events (t=1 s), confirming that the voltage regulator successfully maintains system stability and power quality even under severe operating conditions, while simultaneously achieving the economic dispatch objective (IC synchronization).

FIG. 9 illustrates the performance of the developed APPF-ET-FxT control, considering End-to-End (ETE) communication delays introduced by various realistic communication technologies. The underlying communication framework for the DC microgrid, covering an area of 5 km2, utilizes the IEC 61850 standard with R-GOOSE and R-SV protocols for parameter transmission. The X-axis across all sub-figures represents Time (s), and the Y-axis denotes the corresponding control variable. The simulation demonstrates the superiority and resilience of the control strategy even with non-ideal network conditions.

FIG. 9(A) presents a graphical representation 900A of the Incremental Cost (IC) synchronization convergence plotted against time, in accordance with embodiments of the present disclosure. The Y-axis simultaneously indicates the Incremental Cost (IC) (cent/), showing the IC trajectories for the four $DG_1$, $DG_2$, $DG_3$, and $DG_4$, respectively. The ICs of the DGs converge quickly to the optimal consensus value, demonstrating the control's economic objective is met under minimal communication delay. DG 1 IC: Bar 902, DG 2 IC: Bar 904, DG 3 IC: Bar 906, DG 4 IC: Bar 908.

Bottom Plot (Y-axis: Average DC Bus Voltage (V)): The bars 910, 912, 916, 918 represent voltage. Bar 914 represents the average microgrid voltage ($V_{avg}$). The voltage trajectory, which is quickly restored and tightly maintained at the nominal value (e.g., 200V), confirms voltage regulation under ideal conditions.

FIG. 9(B) depicts a graphical representation 900B of the Average DC Bus Voltage ($V_{avg}$) regulation convergence plotted against time, in accordance with embodiments of the present disclosure. FIG. 9(B) depicts the system performance under ETE delays introduced by an IEEE 802.11g (WiFi) network. The Y-axis similarly indicates the Incremental Cost (IC) (cent/W). Compared to Ethernet, the IC lines may exhibit slightly more pronounced dynamic fluctuations due to the communication delays. However, the controller adeptly forces the ICs back to the consensus value. DG 1 IC: Bar 920, DG 2 IC: Bar 922, DG 3 IC: Bar 924, DG 4 IC: Bar 926.

Bottom Plot (Y-axis: Average DC Bus Voltage (V)): The bars 928, 930, 934, 936 represent voltage. Shows the average microgrid voltage ($V_{avg}$). Bar 932 represents the voltage trajectory, which remains stable and is successfully restored to the rated value, illustrating the system's ability to handle the characteristic delays of this WiFi standard without sacrificing voltage stability.

FIG. 9(C) depicts a graphical representation 900C of the system performance under ETE delays using a more advanced IEEE 802.11n (WiFi) network as provided in table II. Top Plot (Y-axis: Incremental Cost (cent/W): Shows the IC trajectories. Bar 938 corresponds to DG 1, bar 940 to DG 2, bar 942 to DG 3, and bar 944 to DG 4. This plot confirms that the fixed-time convergence property holds; despite the varying delay profile, the DGs' ICs successfully synchronize to the optimal equilibrium.

Bottom Plot (Y-axis: Average DC Bus Voltage (V)): The bars 946, 948, 952, 954 represent voltage. Shows the average microgrid voltage ($V_{avg}$). Bar 952 represents the voltage trajectory. This final plot verifies that even with the ETE communication delays inherent in the 802.11n technology, the voltage regulator maintains the average bus voltage at the nominal value within the allocated settling time, confirming the overall superior performance and practical viability of the control strategy of the present disclosure.

In summary, FIG. 9(A)-9(C) collectively verify that the APPF-ET-FxT control strategy of the present disclosure is robust and practically viable, ensuring stable and economical operation of the DC microgrid across a range of realistic communication delays.

represents the voltage trajectory. Voltage regulation in this method takes approximately 0.79 s to restore the average voltage to its nominal value.

FIG. 10(B) depicts a graphical representation 1000B of the Incremental Costs (ICs) of the DGs and the Average DC Bus Voltage plotted against time, in accordance with embodiments of the present disclosure.

Top Plot (Y-axis: Incremental Cost (cent/W): Shows the IC trajectories. The four lines (Bars 1012, 1014, 1016, 1018) illustrate a faster convergence rate than the asymptotic method. IC synchronization is achieved within approximately 0.46 seconds.

Bottom Plot (Y-axis: Average DC Bus Voltage (V)): Shows the average microgrid voltage ($V_{avg}$). Bar 1020 represents the voltage trajectory. Voltage restoration is completed in approximately 0.6 seconds, demonstrating the benefit of FT stability over the asymptotic approach, although it is still slower than the method of the present disclosure.

FIG. 10(C) shows a graphical representation 1000C of the Incremental Costs (ICs) of the DGs and the Average DC Bus Voltage plotted against time, in accordance with embodiments of the present disclosure.

Top Plot (Y-axis: Incremental Cost (cent/W): Shows the IC trajectories. The four lines (Bars 1022, 1024, 1026, 1028) demonstrate the fastest convergence. IC synchronization is

TABLE II

| | INFORMATION FLOWS AND COMMUNICATION DELAYS | | | | | |
|---|---|---|---|---|---|---|
| | | | | | ETE Delay (ms) | |
| | | | | Ethernet 1 | | |
| Sender | Receiver | Parameter shared | Protocol | Gbps | 802.11g_24Mbps | 802.11n_5Ghz |
| $DG_1$ | $DG_2\ DG_4$ | $\hat{v}_1$ | R-SV | 2.84 | 19.04 | 14.59 |
| | | $\xi_1$ | R-GOOSE | 2.64 | 18.82 | 14.59 |
| $DG_2$ | $DG_1, DG_3$ | $\hat{v}_2$ | R-SV | 2.24 | 17.97 | 13.62 |
| | | $\xi_2$ | R-GOOSE | 2.3 | 17.90 | 13.45 |
| $DG_3$ | $DG_2, DG_4$ | $\hat{v}_3$ | R-SV | 2.55 | 17.24 | 14.1 |
| | | $\xi_3$ | R-GOOSE | 2.53 | 17.23 | 14.12 |
| $DG_4$ | $DG_1, DG_3$ | $\hat{v}_4$ | R-SV | 2.31 | 18.01 | 14.66 |
| | | $\xi_4$ | R-GOOSE | 2.30 | 17.89 | 14.72 |

FIG. 10 presents a detailed comparative analysis illustrating the dynamic performance of the APPF-ET-FxT control method of the present disclosure in comparison to two established control strategies: ET-asymptotic consensus and ET-FT control. The assessment was carried out under the same operating conditions. The X-axis across all sub-figures represents Time (s), and the Y-axis across all sub-figures simultaneously denotes the Incremental Cost (IC) (cent/W) (left axis) and the Average DC Bus Voltage (V) (right axis).

FIG. 10(A) presents a graphical representation 1000A of the Incremental Costs (ICs) of the DGs and the Average DC Bus Voltage plotted against time, in accordance with embodiments of the present disclosure.

Top Plot (Y-axis: Incremental Cost (cent/W): Shows the IC trajectories for the $DG_1$, $DG_2$, $DG_3$, and $DG_4$, respectively. The four lines (Bars 1002, 1004, 1006, 1008) track the ICs, which converge to the consensus value. The convergence time for IC synchronization is approximately 0.68 s, confirming the relatively slow response characteristic of asymptotic stability.

Bottom Plot (Y-axis: Average DC Bus Voltage (V)): Shows the average microgrid voltage (Vavg). Bar 1010 achieved significantly faster, in just 0.19 s. This represents a 72% improvement over the ET-asymptotic method and a 59% improvement over the ET-FT method.

Bottom Plot (Y-axis: Average DC Bus Voltage (V)): Shows the average microgrid voltage ($V_{avg}$). Bar 1030 represents the voltage trajectory. Voltage restoration is completed in only 0.18 s, representing a 75.9% improvement compared to the asymptotic method and a 68.3% improvement over the ET-FT controller.

In summary, FIG. 10(A)-10(C) collectively validates that the APPF-ET-FxT controller of the present disclosure provides a substantially faster dynamic response for both IC equalization and voltage regulation, confirming its enhanced suitability for microgrids with demanding stability demands.

Figure 11:
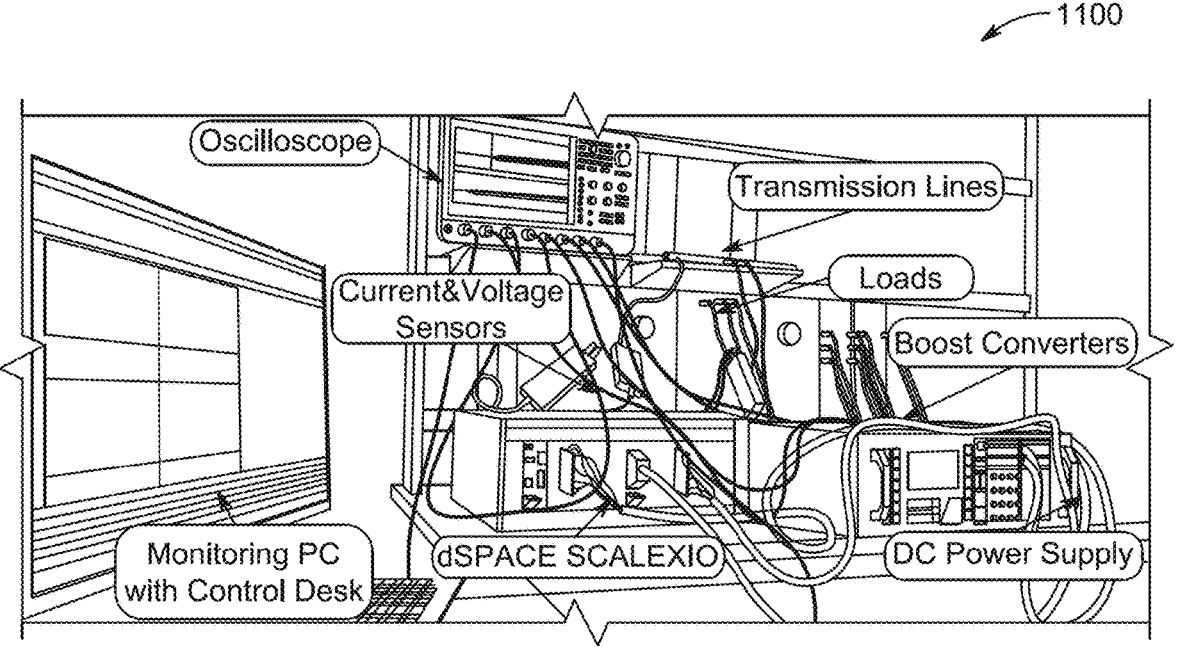
FIG. 11 presents the experimental setup of the 200V DC MG prototype, in accordance with embodiments of the present disclosure.

FIG. 11 presents the experimental setup 1100 of the 200V DC MG prototype, which includes four boost converters, sensor boards, resistive loads, and line impedances.

Table III provides the generation cost functions of the DGs and the electrical specifications of the test configuration. Parameters of the APPF are $\wp_i=50$, $\rho_{i,0}=1$, $\in=0.2$, $\rho_{i,s}=0.05$, $\breve{\mu}_i=1$, $\beta_{min}=10$, $\beta_{max}=1000$, and $\alpha_i=1$. The sampling period is $\delta=1$ μs. The system's hierarchical control architecture is implemented and simulated using the dSPACE SCALEXIO platform, which generates the PWM signals for the converters. In the cyber layer of the network, the adjacency matrix is defined as $\mathcal{A} = [0,1,0,1; 1,0,1,0; 0,1,0,1; 1,0,1,0] \in \mathbb{R}^{4 \times 4}$, while the diagonal pinning adjacency matrix is set as $\mathcal{B} = \text{diag}\{1,0,0,0\}$.

TABLE III

EXPERIMENTAL DC MG' PARAMETERS

| DGs production costs | | | |
|---|---|---|---|
| DG | $c_i(\cent)$ | $b_i(\cent/W)$ | $a_i(\cent/W^2)$ |
| $DG_1$ | 85 | 0.62 | 0.012 |
| $DG_2$ | 80 | 0.61 | 0.01 |
| $DG_3$ | 75 | 0.6 | 0.008 |
| $DG_4$ | 66 | 0.59 | 0.007 |

| DC-DC converters Parameters | | | |
|---|---|---|---|
| $V_{in}$ | $F_{SW}$ | $L_f$ | $C_f$ |
| 50 V | 15 kHz | 3.3 mH | 470 μF |

| Transmission network parameters | | |
|---|---|---|
| R | L | C |
| 2 Ω | 100 μH | 50 nF |

| Controller parameters | | | | | | | |
|---|---|---|---|---|---|---|---|
| $K_1^c$ | $K_2^c$ | $K_1^v$ | $\phi_1^c$ | $K_2^v$ | $\phi_2^c$ | $\phi_1^v$ | $\phi_2^v$ |
| 1 | 1 | 1 | 1 | 0.5 | 1.5 | 0.5 | 1.5 |

Figure 12:
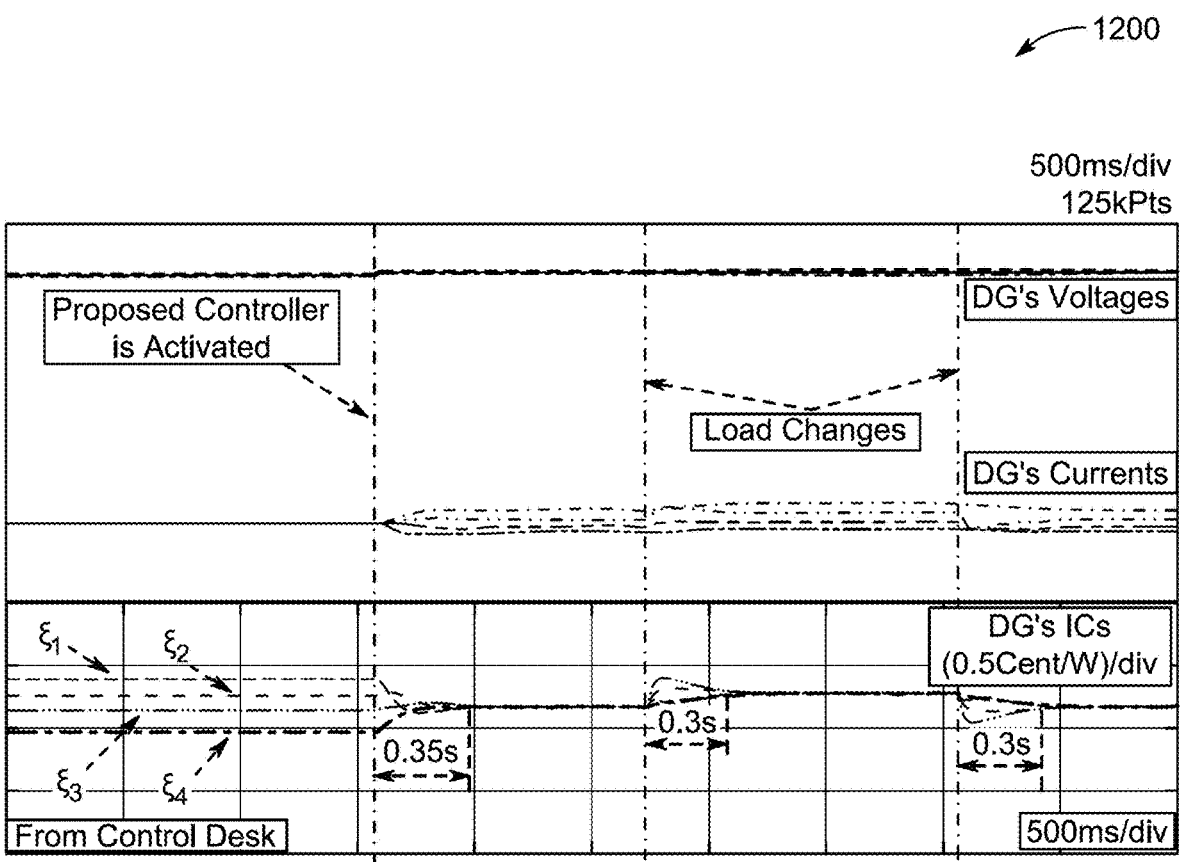
FIG. 12 illustrates the experimental performance of the controller of the present disclosure under varying load conditions, in accordance with embodiments of the present disclosure.

FIG. 12 illustrates the experimental performance 1200 of the controller of the present disclosure under varying load conditions, in accordance with embodiments of the present disclosure. Initially, only the primary control layer is operational, while the distributed secondary control layer remains inactive. During this phase, the plurality of Distributed Generators (DGs) share the total load demand proportionally based on respective droop gain parameters.

Subsequently, upon activation of the controller of the present disclosure, the incentive coefficients (ICs) of the DGs attain an optimal consensus value, as depicted in FIG. 12. The attainment of consensus results in an economical load distribution among the DGs within approximately 0.35 seconds, thereby ensuring that the system achieves the desired steady-state performance. The average voltage of the Microgrid (MG) is maintained at a nominal value of approximately 200 volts, while preserving the equality constraint within a predetermined convergence interval.

To further evaluate the robustness of the control mechanism of the present disclosure, a dynamic load variation test is performed. As illustrated in FIG. 9, the DGs autonomously regulate and adjust their respective output currents in response to variations in the load demand, thereby sustaining optimal power sharing and system stability. The controller effectively of the present disclosure maintains the performance criteria with reduced and bounded transient fluctuations. Moreover, the ICs of the DGs converge to the optimal reference value within approximately 0.3 seconds, thereby validating the controller's capability to achieve fast, stable, and economically efficient operation under dynamic load conditions.

In conclusion, the present disclosure provides a novel distributed control strategy based on an Adaptive Prescribed Performance Function (APPF) integrated with an Event- Triggered Fixed-Time (ET-FxT) control framework for enhancing the operational performance of standalone Direct Current (DC) Microgrids (MGs). The control methodology of the present disclosure ensures optimal and economical power distribution among a plurality of Distributed Generators (DGs) while maintaining the average MG voltage within a predefined regulation range and achieving convergence within an accelerated and fixed timeframe. By incorporating a prescribed performance trajectory, the control objectives are achieved with guaranteed bounded dynamics and reduced communication overhead.

The control architecture of the present disclosure further includes an event-triggered distributed cost optimization module that dynamically allocates generation among DGs in an economical manner while respecting their operational and generation constraints. Additionally, a distributed voltage control mechanism is implemented to regulate the MG's average voltage at its nominal reference value, thereby ensuring voltage stability during both transient and steady-state conditions. The integration of adjustable performance criteria enables efficient control with reduced computational and control effort. Comprehensive simulation and experimental evaluations substantiate the effectiveness and robustness of the control approach of the present disclosure, demonstrating superior dynamic response, faster convergence, and improved efficiency compared to conventional distributed control techniques. Accordingly, the present disclosure provides an enhanced, resilient, and communication-efficient framework for optimal control and coordination in standalone DC Microgrid environments.

Next, further details of the hardware description of the computing environment of FIG. 1 according to exemplary embodiments are described with reference to FIG. 13.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skilled in the art would recognize. Further, CPU 1301, 1303 may be implemented as multiple processors cooperatively working in parallel to perform the instructions of the inventive processes described above.

Figure 13:
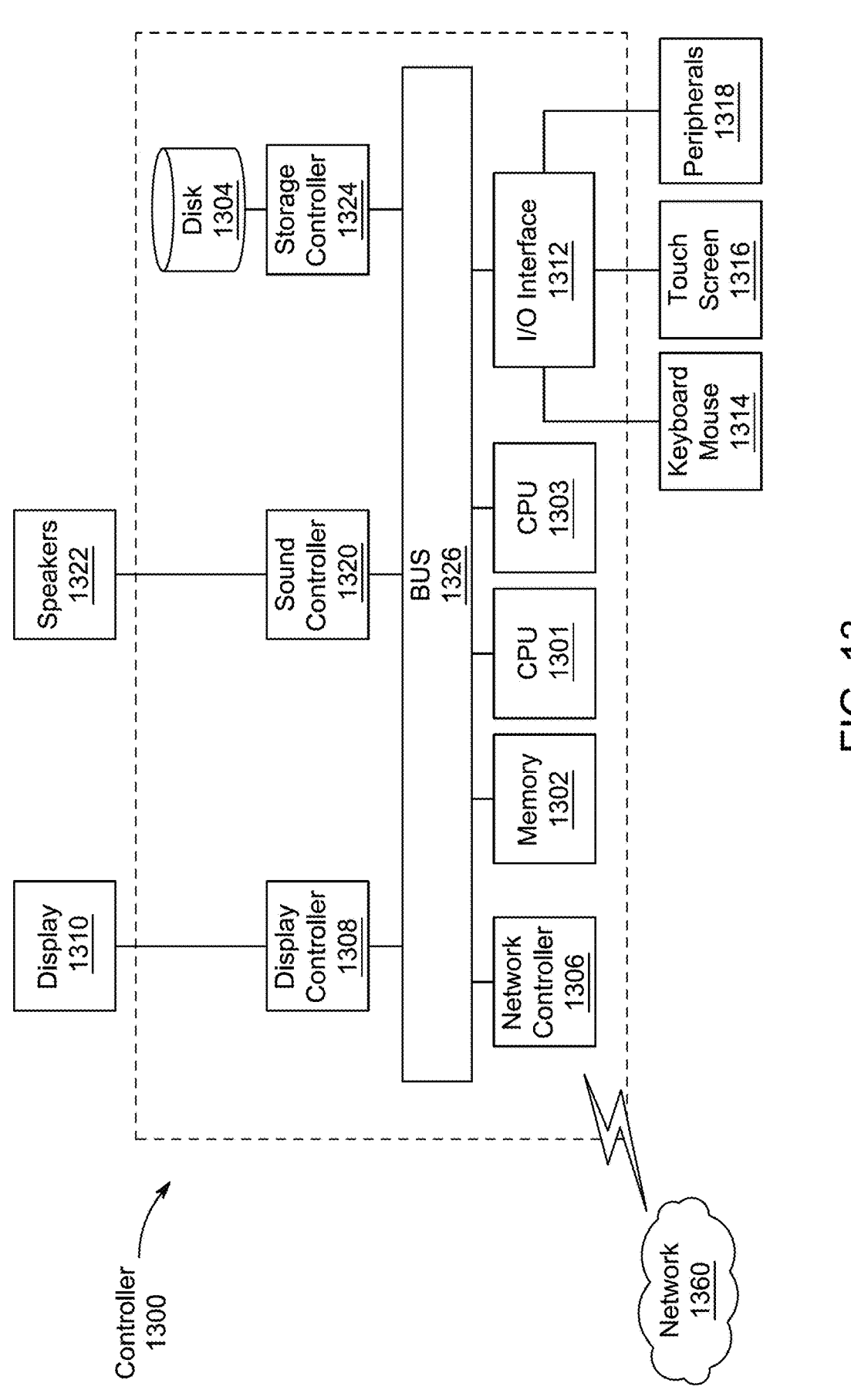
FIG. 13 is an illustration of a non-limiting example of details of computing hardware used in a computing system, according to certain embodiments.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general-purpose storage controller 1324 connects the storage medium disk 1904 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 14:
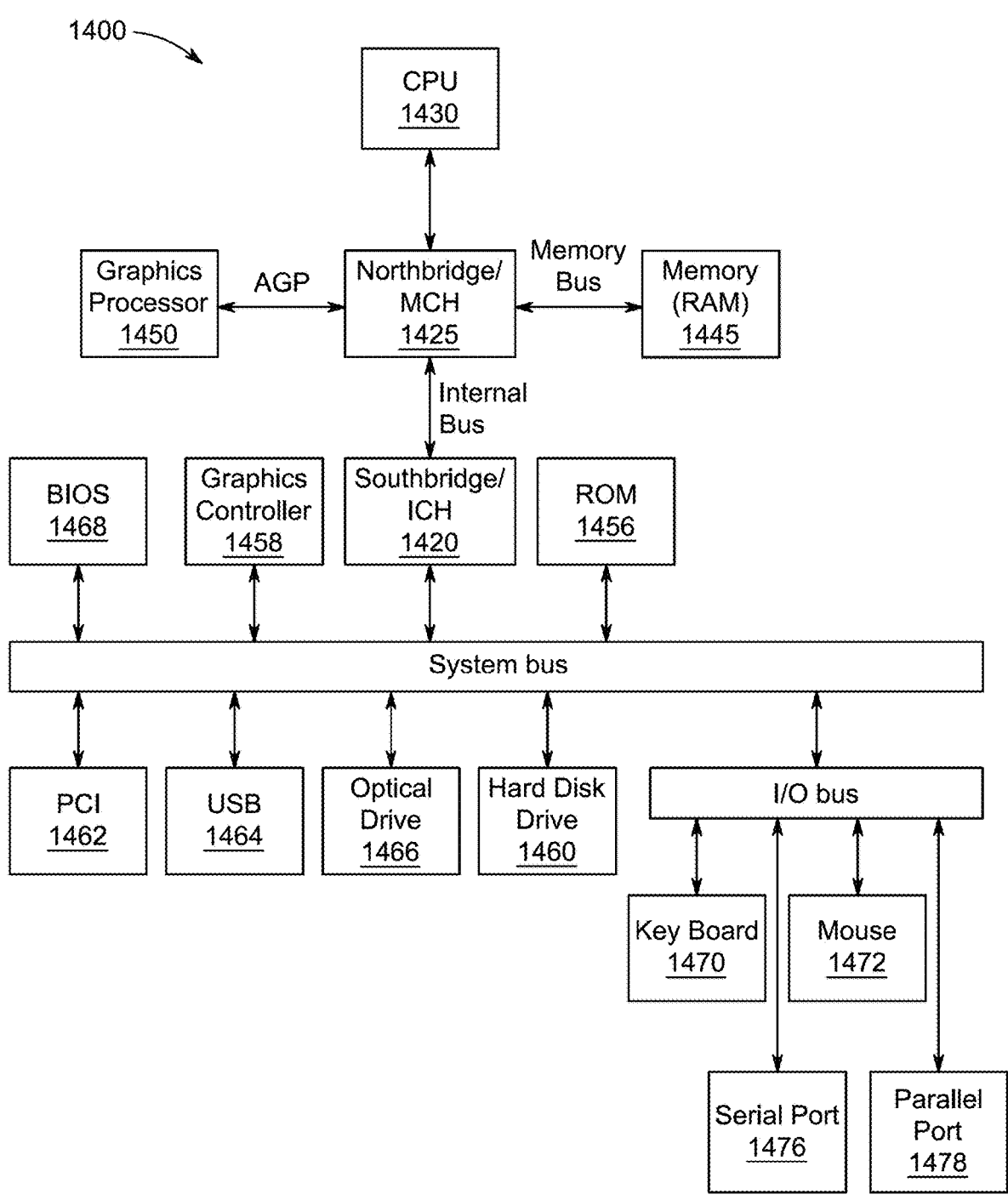
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1485 and a south bridge and input/output (I/O) controller hub (SB/ICH) 1480. The central processing unit (CPU) 1430 is connected to NB/MCH 1485. The NB/MCH 1425 also connects to the memory 1445 via a memory bus and connects to the graphics processor 1450 via an accelerated graphics port (AGP). The NB/MCH 1425 also connects to the SB/ICH 1420 via an internal bus (e.g., a unified media interface or a direct media interface). The central processing unit (CPU) 1430 may contain one or more processors and even may be implemented using one or more heterogeneous processor systems.

Figure 15:
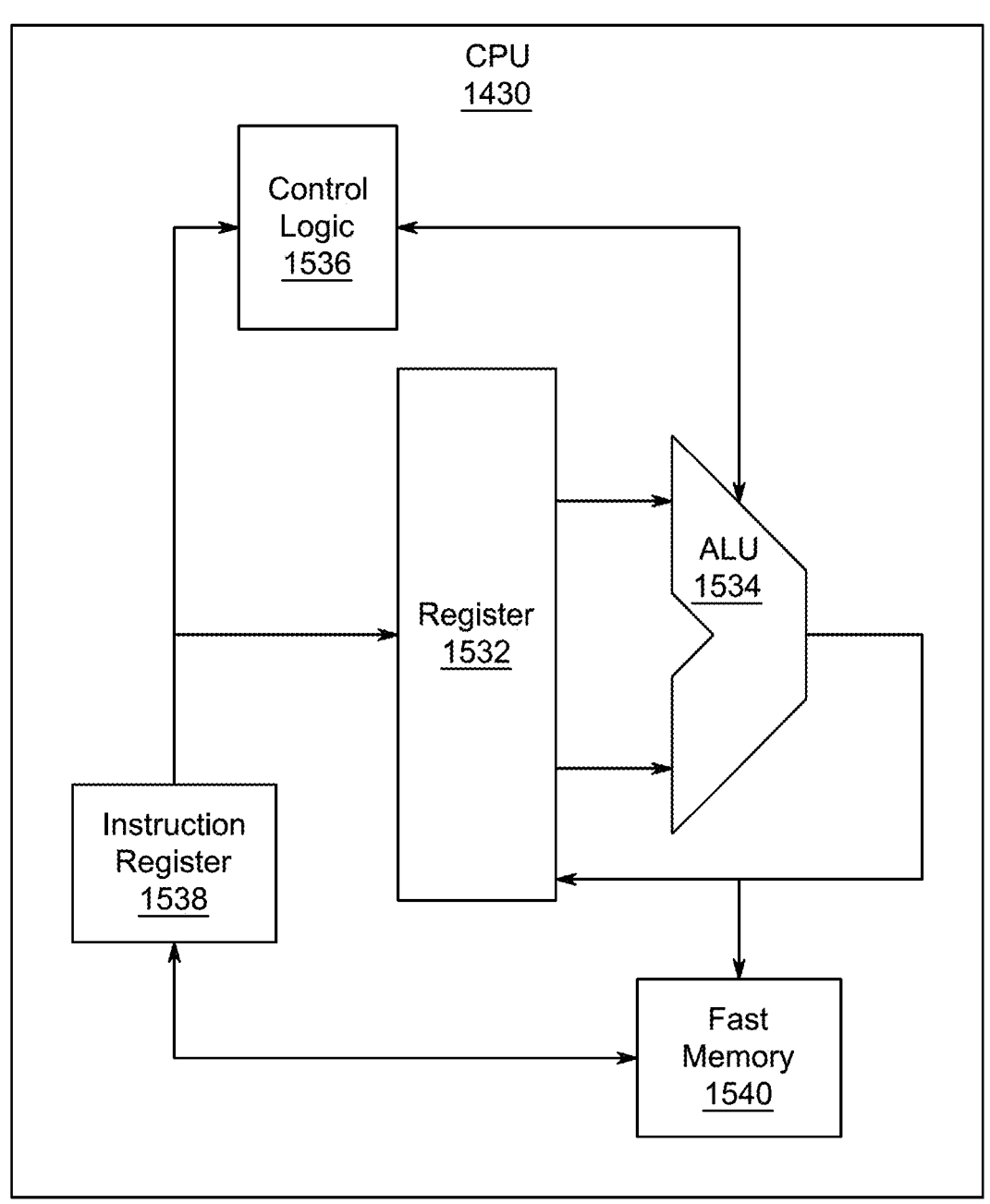
FIG. 15 is an exemplary schematic diagram of a processor used with the computing system, according to certain embodiments.

For example, FIG. 15 shows one implementation of CPU 1430. In one implementation, the instruction register 1582 retrieves instructions from the fast memory 1540. At least part of these instructions is fetched from the instruction register 1538 by the control logic 1586 and interpreted according to the instruction set architecture of the CPU 1430. Part of the instructions can also be directed to the register 1532. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain implementations, the instruction set architecture of the CPU 1430 can use a reduced instruction set architecture, a complex instruction set architecture, a vector processor architecture, and a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x56 processor by Intel or by AMD, an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1480 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1480 through a PCI bus 1462.

The PCI devices may include, for example, Ethernet adapters, add-in cards, and PC cards for notebook computers. The Hard disk drive 1460 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1480 through a system bus. In one implementation, a keyboard 1470, a mouse 1472, a parallel port 1478, and a serial port 1476 can be connected to the system bus through the I/O bus. Other peripherals and devices that can be connected to the SB/ICH 1480 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the demands of the intended back-up load to be powered.

Figure 16:
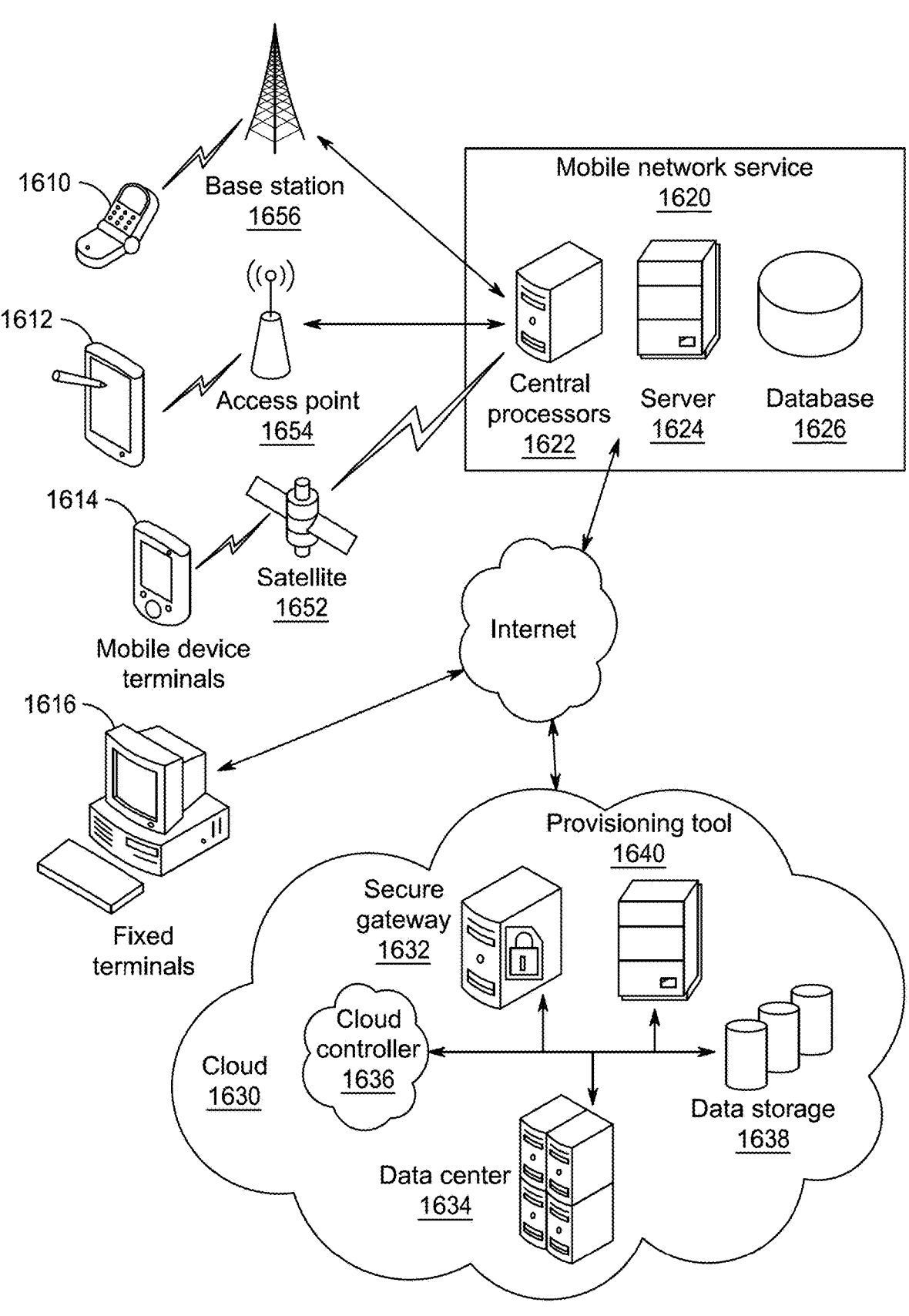
FIG. 16 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 16 illustrates client devices including smart phone 1610, tablet 1612, mobile device terminal 1614 and fixed terminals 1616. These client devices may be communicatively coupled with a mobile network service 1620 via base station 1656, access point 1654, satellite 1652 or via an internet connection. Mobile network service 1620 may comprise central processors 1622, server 1624 and database 1626. Fixed terminals 1616 and mobile network service 1620 may be commutatively coupled via an internet connection to functions in cloud 1630 that may comprise security gateway 1632, data center 1634, cloud controller 1636, data storage 1638 and provisioning tool 1640.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for distributed control of a direct current (DC) microgrid having a plurality of distributed generators (DGs) coupled to a DC bus through a plurality of converters, the method comprising:

measuring a local voltage and a local current of each of the plurality of DGs;

computing, using a distributed voltage observer and neighbor information received via a communication network, a local estimate of an average bus voltage of the DC microgrid;

determining an incremental cost (IC) consensus error based on differences between a local IC and ICs of one or more neighboring DGs obtained from the neighbor information and determining a bus voltage regulation error based on a difference between the local estimate of the average bus voltage and a nominal bus voltage;

applying an adjustable prescribed performance function (APPF) to maintain the IC consensus error and the bus voltage regulation error within time-varying performance bounds;

computing control inputs from the IC consensus error and the bus voltage regulation error using a controller configured to achieve convergence within a fixed time independent of initial values of the IC consensus error and the bus voltage regulation error;

transmitting updated neighbor information over the communication network upon a triggering condition is satisfied; and updating a droop reference of each of the plurality of converters to equalize the ICs of the plurality of DGs subject to respective DG power limits and to regulate local estimate of an average bus voltage of the microgrid towards the nominal bus voltage.

2. The method of claim 1, wherein applying the APPF comprises adjusting the time-varying performance bounds during transients of the IC consensus error and the bus voltage regulation error.

3. The method of claim 1, further comprising transforming each of the IC consensus error and the voltage regulation error into respective transformed errors and mapping the respective transformed errors using a monotone mapping function that diverges as a corresponding error approaches a respective bound of the time-varying performance bounds.

4. The method of claim 1, wherein the neighbor information comprises ICs of the one or more neighboring DGs and one or more voltage-observer variables including one or more estimated average-voltage values and one or more last event timestamps.

5. The method of claim 1, wherein computing the control inputs comprises establishing a fixed-time convergence by satisfying a Lyapunov stability function.

6. The method of claim 1, wherein transmitting the updated neighbor information comprises enforcing a positive minimum inter-event time to prevent Zeno behavior.

7. The method of claim 1, wherein the triggering condition comprises comparing a deviation between a current communicated state value selected from a local IC or an estimated average bus voltage value from the distributed voltage observer and a last transmitted state value to a predetermined threshold.

8. The method of claim 1, wherein computing the local estimate of the average bus voltage comprises pinning at least one DG to the nominal bus voltage.

9. The method of claim 1, wherein equalizing the ICs of the plurality of DGs comprises realizing economic dispatch while enforcing the DG power limits by holding a constrained DG at a generation limit.

10. The method of claim 1, wherein computing the IC comprises differentiating a differentiable generation-cost function with respect to a DG output power.

11. The method of claim 1, wherein updating the droop reference comprises supplying the droop reference to an inner voltage loop of a primary droop controller of the converter.

12. The method of claim 1, further comprising maintaining boundedness of the IC consensus error and the bus voltage regulation error within the time-varying performance bounds during load disturbances.

13. A distributed control system for a direct current (DC) microgrid, comprising:

a DC bus;

a plurality of distributed generators (DGs) coupled to the DC bus through a plurality of converters, each converter comprising a primary droop controller; and a DG controller associated with each of the plurality of DGs, comprising a processor, a memory, one or more sensors and a communication interface, the memory storing instructions that, when executed by the processor, cause the DG controller to:

measure a local voltage and a local current of each of the plurality of DGs;

compute, using a distributed voltage observer and neighbor information received via the communication interface, a local estimate of an average bus voltage of the microgrid;

determine an incremental cost (IC) consensus error based on differences between a local IC and ICs of one or more neighboring DGs and determine a bus voltage regulation error based on a difference between the local estimate of an average bus voltage and a nominal bus voltage;

apply an adjustable prescribed performance function (APPF) to maintain the IC consensus error and the bus voltage regulation error within time-varying performance bounds;

compute control inputs from the IC consensus error and the bus voltage regulation error using the DG controller configured to achieve a fixed-time convergence independent of initial values of the IC consensus error and the bus voltage regulation error;

transmit updated neighbor information upon a triggering condition is satisfied; and update a droop reference of the converter to equalize the ICs of the DGs subject to DG power limits and to regulate the local estimate of an average bus voltage toward the nominal bus voltage.

14. The distributed control system of claim 13, wherein the DG controllers are configured to transform the IC consensus error and the bus voltage regulation error into respective transformed errors using a monotone mapping function.

15. The distributed control system of claim 13, wherein the APPF dynamically adjusts the time-varying performance bounds during transients of the IC consensus error and the bus voltage regulation error.

16. The distributed control system of claim 13, wherein each DG controller enforces a positive minimum inter-event time when transmitting updated neighbor information to prevent Zeno behavior.

17. The distributed control system of claim 13, wherein the distributed voltage observer is configured to pin at least one DG to the nominal bus voltage.

18. The distributed control system of claim 13, wherein the DG controllers are configured to equalize the ICs of the DGs by realizing economic dispatch while maintaining respective DG power limits.

19. The distributed control system of claim 13, wherein the converters are pulse-width modulated and receive the droop reference as an input to an inner voltage loop of the primary droop controller.

20. The distributed control system of claim 13, wherein the DG controllers are configured to form a connected communication graph represented by an adjacency matrix ensuring convergence of the IC consensus error and the bus voltage regulation error.

\* \* \* \* \*